(12) United States Patent
Lu

(10) Patent No.: US 10,868,974 B2
(45) Date of Patent: Dec. 15, 2020

(54) METHOD FOR DETERMINING ALIGNMENT OF VEHICULAR CAMERAS

(71) Applicant: MAGNA ELECTRONICS INC., Auburn Hills, MI (US)

(72) Inventor: Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/899,105

(22) Filed: Feb. 19, 2018

(65) Prior Publication Data
US 2018/0176482 A1 Jun. 21, 2018

Related U.S. Application Data

(63) Continuation of application No. 13/990,902, filed as application No. PCT/US2011/062834 on Dec. 1, 2011, now Pat. No. 9,900,522.
(Continued)

(51) Int. Cl.
*H04N 5/262* (2006.01)
*B60R 1/00* (2006.01)
(Continued)

(52) U.S. Cl.
CPC ............. *H04N 5/2621* (2013.01); *B60R 1/00* (2013.01); *G06T 3/4038* (2013.01);
(Continued)

(58) Field of Classification Search
CPC ............... H04N 5/2621; H04N 3/4038; H04N 5/23238; H04N 7/18; B60R 1/00; G06T 3/00

See application file for complete search history.

(56) References Cited

U.S. PATENT DOCUMENTS 2,632,040 A 3/1953 Rabinow
2,827,594 A 3/1953 Rabinow
(Continued)

FOREIGN PATENT DOCUMENTS

DE 3248511 7/1984
DE 4107965 9/1991
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Dramos Kalapodas
(74) *Attorney, Agent, or Firm* — Honigman LLP

(57) ABSTRACT

A method for determining alignment of cameras at a vehicle includes mounting first and second cameras at a vehicle and providing an image processor at the vehicle. While the vehicle is moving along the road, first image data captured via the first camera is processed to determine movement of a road feature and second image data captured by the second camera is processed to determine movement of the road feature when the road feature is present in the second image data. The determined movement of the road feature in first image data is compared to the determined movement of the road feature in second image data, and an offset of the second camera relative to the first camera is determined, with the offset caused by a rotational or translational change in position of the first or second camera relative to the other.

18 Claims, 17 Drawing Sheets

Related U.S. Application Data

(60) Provisional application No. 61/482,786, filed on May 5, 2011, provisional application No. 61/418,499, filed on Dec. 1, 2010.

(51) Int. Cl.
   *H04N 5/232* (2006.01)
   *G06T 3/40* (2006.01)

(52) U.S. Cl.
   CPC .... *H04N 5/23238* (2013.01); *B60R 2300/105* (2013.01); *B60R 2300/306* (2013.01); *B60R 2300/607* (2013.01)

(56) References Cited

U.S. PATENT DOCUMENTS

| | | |
|---|---|---|
| 3,985,424 A | 10/1976 | Steinacher |
| 4,037,134 A | 7/1977 | Loper |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,390,895 A | 6/1983 | Sato et al. |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,975 A | 2/1987 | Meitzler et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,693,788 A | 9/1987 | Berg et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,731,769 A | 3/1988 | Schaefer et al. |
| 4,741,603 A | 5/1988 | Miyagi |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,833,534 A | 5/1989 | Paff et al. |
| 4,838,650 A | 6/1989 | Stewart |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,966,441 A | 10/1990 | Conner |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |

(56) References Cited

U.S. PATENT DOCUMENTS

| | | |
|---|---|---|
| 5,214,408 A | 5/1993 | Asayama |
| 5,243,524 A | 9/1993 | Ishida et al. |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |
| 5,642,299 A | 6/1997 | Hardin et al. |
| 5,648,835 A | 7/1997 | Uzawa |
| 5,650,944 A | 7/1997 | Kise |
| 5,657,073 A | 8/1997 | Henley |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |
| 5,914,815 A | 6/1999 | Bos |
| 5,920,367 A | 7/1999 | Kajimoto et al. |
| 5,923,027 A | 7/1999 | Stam et al. |
| 5,938,810 A | 8/1999 | DeLine et al. |
| 5,940,120 A | 8/1999 | Frankhouse et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,668 A | 11/1999 | Szeliski |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,097,024 A | 8/2000 | Stam et al. |
| 6,100,811 A | 8/2000 | Hsu et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |

(56) References Cited

U.S. PATENT DOCUMENTS

| | | | |
|---|---|---|---|
| 6,148,120 | A | 11/2000 | Sussman |
| 6,158,655 | A | 12/2000 | DeVries, Jr. et al. |
| 6,172,613 | B1 | 1/2001 | DeLine et al. |
| 6,173,087 | B1 | 1/2001 | Kumar |
| 6,175,164 | B1 | 1/2001 | O'Farrell et al. |
| 6,175,300 | B1 | 1/2001 | Kendrick |
| 6,184,781 | B1 | 2/2001 | Ramakesavan |
| 6,198,409 | B1 | 3/2001 | Schofield et al. |
| 6,201,642 | B1 | 3/2001 | Bos |
| 6,222,460 | B1 | 4/2001 | DeLine et al. |
| 6,226,061 | B1 | 5/2001 | Tagusa |
| 6,243,003 | B1 | 6/2001 | DeLine et al. |
| 6,250,148 | B1 | 6/2001 | Lynam |
| 6,259,412 | B1 | 7/2001 | Duroux |
| 6,259,423 | B1 | 7/2001 | Tokito et al. |
| 6,266,082 | B1 | 7/2001 | Yonezawa et al. |
| 6,266,442 | B1 | 7/2001 | Laumeyer et al. |
| 6,285,393 | B1 | 9/2001 | Shimoura et al. |
| 6,285,778 | B1 | 9/2001 | Nakajima et al. |
| 6,291,906 | B1 | 9/2001 | Marcus et al. |
| 6,294,989 | B1 | 9/2001 | Schofield et al. |
| 6,297,781 | B1 | 10/2001 | Turnbull et al. |
| 6,302,545 | B1 | 10/2001 | Schofield et al. |
| 6,310,611 | B1 | 10/2001 | Caldwell |
| 6,313,454 | B1 | 11/2001 | Bos et al. |
| 6,317,057 | B1 | 11/2001 | Lee |
| 6,320,176 | B1 | 11/2001 | Schofield et al. |
| 6,320,282 | B1 | 11/2001 | Caldwell |
| 6,326,613 | B1 | 12/2001 | Heslin et al. |
| 6,329,925 | B1 | 12/2001 | Skiver et al. |
| 6,333,759 | B1 | 12/2001 | Mazzilli |
| 6,341,523 | B2 | 1/2002 | Lynam |
| 6,353,392 | B1 | 3/2002 | Schofield et al. |
| 6,359,392 | B1 | 3/2002 | He |
| 6,366,213 | B2 | 4/2002 | DeLine et al. |
| 6,370,329 | B1 | 4/2002 | Teuchert |
| 6,396,397 | B1 | 5/2002 | Bos et al. |
| 6,411,204 | B1 | 6/2002 | Bloomfield et al. |
| 6,411,328 | B1 | 6/2002 | Franke et al. |
| 6,420,975 | B1 | 7/2002 | DeLine et al. |
| 6,424,273 | B1 | 7/2002 | Gutta et al. |
| 6,428,172 | B1 | 8/2002 | Hutzel et al. |
| 6,430,303 | B1 | 8/2002 | Naoi et al. |
| 6,433,676 | B2 | 8/2002 | DeLine et al. |
| 6,433,817 | B1 | 8/2002 | Guerra |
| 6,442,465 | B2 | 8/2002 | Breed et al. |
| 6,477,464 | B2 | 11/2002 | McCarthy et al. |
| 6,485,155 | B1 | 11/2002 | Duroux et al. |
| 6,497,503 | B1 | 12/2002 | Dassanayake et al. |
| 6,498,620 | B2 | 12/2002 | Schofield et al. |
| 6,513,252 | B1 | 2/2003 | Schierbeek et al. |
| 6,515,378 | B2 | 2/2003 | Drummond et al. |
| 6,516,664 | B2 | 2/2003 | Lynam |
| 6,523,964 | B2 | 2/2003 | Schofield et al. |
| 6,534,884 | B2 | 3/2003 | Marcus et al. |
| 6,539,306 | B2 | 3/2003 | Turnbull |
| 6,547,133 | B1 | 4/2003 | DeVries, Jr. et al. |
| 6,553,130 | B1 | 4/2003 | Lemelson et al. |
| 6,559,435 | B2 | 5/2003 | Schofield et al. |
| 6,570,998 | B1 | 5/2003 | Ohtsuka et al. |
| 6,574,033 | B1 | 6/2003 | Chui et al. |
| 6,578,017 | B1 | 6/2003 | Ebersole et al. |
| 6,587,573 | B1 | 7/2003 | Stam et al. |
| 6,589,625 | B1 | 7/2003 | Kothari et al. |
| 6,593,011 | B2 | 7/2003 | Liu et al. |
| 6,593,565 | B2 | 7/2003 | Heslin et al. |
| 6,593,698 | B2 | 7/2003 | Stam et al. |
| 6,594,583 | B2 | 7/2003 | Ogura et al. |
| 6,611,202 | B2 | 8/2003 | Schofield et al. |
| 6,611,610 | B1 | 8/2003 | Stam et al. |
| 6,627,918 | B2 | 9/2003 | Getz et al. |
| 6,631,316 | B2 | 10/2003 | Stam et al. |
| 6,631,994 | B2 | 10/2003 | Suzuki et al. |
| 6,636,258 | B2 | 10/2003 | Strumolo |
| 6,648,477 | B2 | 11/2003 | Hutzel et al. |
| 6,650,233 | B2 | 11/2003 | DeLine et al. |
| 6,650,455 | B2 | 11/2003 | Miles |
| 6,672,731 | B2 | 1/2004 | Schnell et al. |
| 6,674,562 | B1 | 1/2004 | Miles |
| 6,678,056 | B2 | 1/2004 | Downs |
| 6,678,614 | B2 | 1/2004 | McCarthy et al. |
| 6,680,792 | B2 | 1/2004 | Miles |
| 6,690,268 | B2 | 2/2004 | Schofield et al. |
| 6,691,464 | B2 | 2/2004 | Nestell et al. |
| 6,693,524 | B1 | 2/2004 | Payne |
| 6,700,605 | B1 | 3/2004 | Toyoda et al. |
| 6,703,925 | B2 | 3/2004 | Steffel |
| 6,704,621 | B1 | 3/2004 | Stein et al. |
| 6,710,908 | B2 | 3/2004 | Miles et al. |
| 6,711,474 | B1 | 3/2004 | Treyz et al. |
| 6,714,331 | B2 | 3/2004 | Lewis et al. |
| 6,717,610 | B1 | 4/2004 | Bos et al. |
| 6,735,506 | B2 | 5/2004 | Breed et al. |
| 6,741,377 | B2 | 5/2004 | Miles |
| 6,744,353 | B2 | 6/2004 | Sjönell |
| 6,757,109 | B2 | 6/2004 | Bos |
| 6,762,867 | B2 | 7/2004 | Lippert et al. |
| 6,794,119 | B2 | 9/2004 | Miles |
| 6,795,221 | B1 | 9/2004 | Urey |
| 6,802,617 | B2 | 10/2004 | Schofield et al. |
| 6,806,452 | B2 | 10/2004 | Bos et al. |
| 6,807,287 | B1 | 10/2004 | Hermans |
| 6,822,563 | B2 | 11/2004 | Bos et al. |
| 6,823,241 | B2 | 11/2004 | Shirato et al. |
| 6,824,281 | B2 | 11/2004 | Schofield et al. |
| 6,831,261 | B2 | 12/2004 | Schofield et al. |
| 6,847,487 | B2 | 1/2005 | Burgner |
| 6,864,930 | B2 | 3/2005 | Matsushita et al. |
| 6,882,287 | B2 | 4/2005 | Schofield |
| 6,889,161 | B2 | 5/2005 | Winner et al. |
| 6,891,563 | B2 | 5/2005 | Schofield et al. |
| 6,909,753 | B2 | 6/2005 | Meehan et al. |
| 6,946,978 | B2 | 9/2005 | Schofield |
| 6,953,253 | B2 | 10/2005 | Schofield et al. |
| 6,968,736 | B2 | 11/2005 | Lynam |
| 6,975,775 | B2 | 12/2005 | Rykowski et al. |
| 7,004,593 | B2 | 2/2006 | Weller et al. |
| 7,004,606 | B2 | 2/2006 | Schofield |
| 7,005,974 | B2 | 2/2006 | McMahon et al. |
| 7,038,577 | B2 | 5/2006 | Pawlicki et al. |
| 7,046,448 | B2 | 5/2006 | Burgner |
| 7,062,300 | B1 | 6/2006 | Kim |
| 7,065,432 | B2 | 6/2006 | Moisel et al. |
| 7,085,637 | B2 | 8/2006 | Breed et al. |
| 7,092,548 | B2 | 8/2006 | Laumeyer et al. |
| 7,113,867 | B1 | 9/2006 | Stein |
| 7,116,246 | B2 | 10/2006 | Winter et al. |
| 7,123,168 | B2 | 10/2006 | Schofield |
| 7,133,661 | B2 | 11/2006 | Hatae et al. |
| 7,149,613 | B2 | 12/2006 | Stam et al. |
| 7,151,996 | B2 | 12/2006 | Stein |
| 7,167,796 | B2 | 1/2007 | Taylor et al. |
| 7,195,381 | B2 | 3/2007 | Lynam et al. |
| 7,202,776 | B2 | 4/2007 | Breed |
| 7,224,324 | B2 | 5/2007 | Quist et al. |
| 7,227,459 | B2 | 6/2007 | Bos et al. |
| 7,227,611 | B2 | 6/2007 | Hull et al. |
| 7,249,860 | B2 | 7/2007 | Kulas et al. |
| 7,253,723 | B2 | 8/2007 | Lindahl et al. |
| 7,255,451 | B2 | 8/2007 | McCabe et al. |
| 7,307,655 | B1 | 12/2007 | Okamoto et al. |
| 7,311,406 | B2 | 12/2007 | Schofield et al. |
| 7,325,934 | B2 | 2/2008 | Schofield et al. |
| 7,325,935 | B2 | 2/2008 | Schofield et al. |
| 7,338,177 | B2 | 3/2008 | Lynam |
| 7,339,149 | B1 | 3/2008 | Schofield et al. |
| 7,344,261 | B2 | 3/2008 | Schofield et al. |
| 7,360,932 | B2 | 4/2008 | Uken et al. |
| 7,370,983 | B2 | 5/2008 | DeWind et al. |
| 7,375,803 | B1 | 5/2008 | Bamji |
| 7,380,948 | B2 | 6/2008 | Schofield et al. |
| 7,388,182 | B2 | 6/2008 | Schofield et al. |
| 7,402,786 | B2 | 7/2008 | Schofield et al. |
| 7,423,248 | B2 | 9/2008 | Schofield et al. |

(56) References Cited

U.S. PATENT DOCUMENTS

| | | |
|---|---|---|
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,602,412 B2 | 10/2009 | Cutler |
| 7,605,856 B2 | 10/2009 | Imoto |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,710,463 B2 | 5/2010 | Foote |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,914,188 B2 | 3/2011 | DeLine et al. |
| 7,929,751 B2 | 4/2011 | Zhang |
| 7,930,160 B1 | 4/2011 | Hosagrahara et al. |
| 7,949,486 B2 | 5/2011 | Denny et al. |
| 7,982,766 B2 * | 7/2011 | Corghi ............... G01B 11/2755 |
| | | 348/140 |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,150,210 B2 | 4/2012 | Chen |
| 8,164,628 B2 | 4/2012 | Stein et al. |
| 8,203,440 B2 | 6/2012 | Schofield et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,314,689 B2 | 11/2012 | Schofield et al. |
| 8,324,552 B2 | 12/2012 | Schofield et al. |
| 8,378,851 B2 | 2/2013 | Stein et al. |
| 8,386,114 B2 | 2/2013 | Higgins-Luthman |
| 8,421,865 B2 | 4/2013 | Euler et al. |
| 8,452,055 B2 | 5/2013 | Stein et al. |
| 8,534,887 B2 | 9/2013 | DeLine et al. |
| 8,543,330 B2 | 9/2013 | Taylor et al. |
| 8,553,088 B2 | 10/2013 | Stein et al. |
| 8,643,724 B2 | 2/2014 | Schofield et al. |
| 8,676,491 B2 | 3/2014 | Taylor et al. |
| 8,692,659 B2 | 4/2014 | Schofield et al. |
| 8,699,821 B2 * | 4/2014 | Orr, IV .................... G06T 7/32 |
| | | 382/294 |
| 9,900,522 B2 | 2/2018 | Lu |
| 2001/0002451 A1 | 5/2001 | Breed |
| 2002/0005778 A1 | 1/2002 | Breed |
| 2002/0011611 A1 | 1/2002 | Huang et al. |
| 2002/0113873 A1 | 8/2002 | Williams |
| 2003/0068098 A1 | 4/2003 | Rondinelli |
| 2003/0085999 A1 * | 5/2003 | Okamoto .................. B60R 1/00 |
| | | 348/148 |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0163343 A1 * | 7/2005 | Kakinami .......... G06K 9/00812 |
| | | 382/103 |
| 2005/0219852 A1 | 10/2005 | Stam et al. |
| 2005/0237385 A1 | 10/2005 | Kosaka et al. |
| 2005/0259158 A1 * | 11/2005 | Jacob .................... H04N 5/3456 |
| | | 348/218.1 |
| 2006/0013438 A1 * | 1/2006 | Kubota .............. G06K 9/00805 |
| | | 382/103 |
| 2006/0018511 A1 | 1/2006 | Stam et al. |
| 2006/0018512 A1 | 1/2006 | Stam et al. |
| 2006/0029255 A1 * | 2/2006 | Ozaki ........................ B60R 1/00 |
| | | 382/104 |
| 2006/0050018 A1 | 3/2006 | Hutzel et al. |
| 2006/0066730 A1 | 3/2006 | Evans |
| 2006/0091813 A1 | 5/2006 | Stam et al. |
| 2006/0103727 A1 | 5/2006 | Tseng |
| 2006/0125921 A1 * | 6/2006 | Foote ..................... G06T 3/4038 |
| | | 348/159 |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0165909 A1 | 7/2007 | Leleve |
| 2007/0236595 A1 | 10/2007 | Pan et al. |
| 2007/0242339 A1 | 10/2007 | Bradley |
| 2007/0291189 A1 | 12/2007 | Harville |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0253606 A1 * | 10/2008 | Fujimaki ..................... G06T 7/85 |
| | | 382/100 |
| 2008/0266396 A1 | 10/2008 | Stein |
| 2009/0022422 A1 | 1/2009 | Sorek |
| 2009/0113509 A1 | 4/2009 | Tseng et al. |
| 2009/0256938 A1 | 4/2009 | Bechtel et al. |
| 2009/0153549 A1 | 6/2009 | Lynch et al. |
| 2009/0179773 A1 | 7/2009 | Denny |
| 2009/0190015 A1 | 7/2009 | Bechtel et al. |
| 2009/0243889 A1 * | 10/2009 | Suhr .................. G06K 9/00812 |
| | | 340/932.2 |
| 2009/0290032 A1 | 11/2009 | Zhang et al. |
| 2009/0160987 A1 | 12/2009 | Bechtel et al. |
| 2010/0014770 A1 | 1/2010 | Huggett |
| 2011/0115912 A1 | 5/2011 | Kuehnle |
| 2011/0156887 A1 | 6/2011 | Shen |
| 2011/0164108 A1 | 7/2011 | Bates |
| 2011/0216201 A1 | 9/2011 | McAndrew et al. |
| 2012/0045091 A1 * | 2/2012 | Kaganovich ............ G06T 7/579 |
| | | 382/103 |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0162828 A1 | 6/2013 | Higgins-Luthman |
| 2013/0169812 A1 | 7/2013 | Lu et al. |
| 2013/0286193 A1 | 10/2013 | Pflug |
| 2014/0015976 A1 | 1/2014 | DeLine et al. |
| 2014/0022378 A1 | 1/2014 | Higgins-Luthman |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | |
|---|---|---|
| DE | 4124654 | 1/1993 |
| EP | 0202460 | 11/1986 |
| EP | 0353200 | 1/1990 |
| EP | 0527665 | 2/1991 |
| EP | 0450553 | 10/1991 |
| EP | 0492591 | 7/1992 |

(56) References Cited

FOREIGN PATENT DOCUMENTS

| | | |
|---|---|---|
| EP | 0513476 | 11/1992 |
| EP | 0361914 | 2/1993 |
| EP | 0605045 | 7/1994 |
| EP | 0640903 | 3/1995 |
| EP | 0697641 | 2/1996 |
| EP | 1022903 | 7/2000 |
| EP | 1065642 | 1/2001 |
| EP | 1074430 | 2/2001 |
| EP | 1115250 | 7/2001 |
| EP | 1170173 | 1/2002 |
| EP | 2181417 | 5/2010 |
| EP | 2523831 | 7/2011 |
| EP | 2377094 | 10/2011 |
| EP | 2710340 | 3/2014 |
| EP | 3189497 | 7/2017 |
| GB | 2233530 | 9/1991 |
| JP | S5539843 | 3/1980 |
| JP | 58110334 | 6/1983 |
| JP | 59114139 | 7/1984 |
| JP | 6079889 | 5/1985 |
| JP | 6080953 | 5/1985 |
| JP | 6216073 | 4/1987 |
| JP | 6272245 | 5/1987 |
| JP | 62131837 | 6/1987 |
| JP | 6414700 | 1/1989 |
| JP | 01123587 | 5/1989 |
| JP | H1168538 | 7/1989 |
| JP | H236417 | 8/1990 |
| JP | H2117935 | 9/1990 |
| JP | 03099952 | 4/1991 |
| JP | 04239400 | 11/1991 |
| JP | 04114587 | 4/1992 |
| JP | 0577657 | 3/1993 |
| JP | 05050883 | 3/1993 |
| JP | 05213113 | 8/1993 |
| JP | 06107035 | 4/1994 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | H730149 | 6/1995 |
| JP | 2630604 | 7/1997 |
| JP | 200274339 | 3/2002 |
| JP | 200383742 | 3/2003 |
| JP | 20041658 | 1/2004 |
| WO | WO1994019212 | 2/1994 |
| WO | WO1996021581 | 7/1996 |
| WO | WO1996038319 | 12/1996 |
| WO | WO2001080353 | 10/2001 |
| WO | WO2012139636 | 10/2012 |
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Brown, A Survey of Image Registration Techniques, vol. 24, ACM Computing Surveys, pp. 325-376, 1992.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Cucchiara et al., Vehicle Detection under Day and Night Illumination, 1999.
Dickmanns et al., "A Curvature-based Scheme for Improving Road Vehicle Guidance by Computer Vision," University of Bundeswehr München, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al.; "An integrated spatio-temporal approach to automatic visual guidance of autonomous vehicles," IEEE Transactions on Systems, Man, and Cybernetics, vol. 20, No. 6, Nov./Dec. 1990.
Dickmanns, "4-D dynamic vision for intelligent motion control", Universitat der Bundeswehr Munich, 1991.
Donnelly Panoramic Vision™ on Renault Talisman Concept Car at Frankfort Motor Show, PR Newswire, Frankfort, Germany Sep. 10, 2001.
Franke et al., "Autonomous driving approaches downtown", Intelligent Systems and Their Applications, IEEE 13 (6), 40-48, Nov./Dec. 1999.
Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.
Honda Worldwide, "Honda Announces a Full Model Change for the Inspire." Jun. 18, 2003.
International Search Report and Written Opinion dated Mar. 2, 2012 from corresponding PCT Application No. PCT/US2011/062834.
Kan et al., "Model-based vehicle tracking from image sequences with an application to road surveillance," Purdue University, XP000630885, vol. 35, No. 6, Jun. 1996.
Kastrinaki et al., "A survey of video processing techniques for traffic applications", copyright 2003.
Kluge et al., "Representation and Recovery of Road Geometry in YARF," Carnegie Mellon University, pp. 114-119.
Koller et al., "Binocular Stereopsis and Lane Marker Flow for Vehicle Navigation: Lateral and Longitudinal Control," University of California, Mar. 24, 1994.
Kuhnert, "A vision system for real time road and object recognition for vehicle guidance," in Proc. SPIE Mobile Robot Conf, Cambridge, MA, Oct. 1986, pp. 267-272.
Lu, M., et al. On-chip Automatic Exposure Control Technique, Solid-State Circuits Conference, 1991. ESSCIRC '91. Proceedings—Seventeenth European (vol. 1) with abstract.
Malik et al., "A Machine Vision Based System for Guiding Lane-change Maneuvers," Sep. 1995.
Mei Chen et al., AURORA: A Vision-Based Roadway Departure Warning System, The Robotics Institute, Carnegie Mellon University, published Aug. 9, 1995.
Morgan et al., "Road edge tracking for robot road following: a real-time implementation," vol. 8, No. 3, Aug. 1990.
Philomin et al., "Pedestrian Tracking from a Moving Vehicle".
Porter et al., "Compositing Digital Images," Computer Graphics (Proc. Siggraph), vol. 18, No. 3, pp. 253-259, Jul. 1984.
Pratt, "Digital Image Processing, Passage—ED.3", John Wiley & Sons, US, Jan. 1, 2001, pp. 657-659, XP002529771.
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review".
Szeliski, Image Mosaicing for Tele-Reality Applications, DEC Cambridge Research Laboratory, CRL 94/2, May 1994.
Toyota Motor Corporation, "Present and future of safety technology development at Toyota." 2004.

(56) References Cited

OTHER PUBLICATIONS

Tremblay, M., et al. High resolution smart image sensor with integrated parallel analog processing for multiresolution edge extraction, Robotics and Autonomous Systems 11 (1993), pp. 231-242, with abstract.
Tsugawa et al., "An automobile with artificial intelligence," in Proc. Sixth IJCAI, 1979.
Turk et al., "VITS—A Vision System for Autonomous Land Vehicle Navigation," IEEE, 1988.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vellacott, Oliver, "CMOS in Camera," IEE Review, pp. 111-114 (May 1994).
Vlacic et al. (Eds), "Intelligent Vehicle Technologies, Theory and Applications", Society of Automotive Engineers Inc., edited by SAE International, 2001.
Wolberg, "A Two-Pass Mesh Warping Implementation of Morphing," Dr. Dobb's Journal, No. 202, Jul. 1993.
Wolberg, Digital Image Warping, IEEE Computer Society Press, 1990.
Zheng et al., "An Adaptive System for Traffic Sign Recognition," IEEE Proceedings of the Intelligent Vehicles '94 Symposium, pp. 165-170 (Oct. 1994).

\* cited by examiner

| CAMERA # | ORIGINAL X | ORIGINAL Y | FINAL X | FINAL Y |
|---|---|---|---|---|
| - | - | - | - | - |
| - | - | - | - | - |
| - | - | - | - | - |
| 0 | 200 | 100 | 100 | 50 |
| 0 | 203 | 101 | 101 | 50 |
| 0 | 205 | 102 | 102 | 50 |
| 0 | 207 | 102 | 103 | 50 |
| - | - | - | - | - |
| - | - | - | - | - |
| - | - | - | - | - |
| 1 | 150 | 250 | 80 | 350 |
| 1 | 153 | 249 | 81 | 350 |
| 1 | 155 | 249 | 82 | 350 |
| 1 | 158 | 248 | 83 | 350 |
| - | - | - | - | - |
| - | - | - | - | - |
| - | - | - | - | - |
| 2 | 400 | 300 | 250 | 400 |
| 2 | 405 | 300 | 250 | 401 |
| 2 | 410 | 300 | 250 | 402 |
| 2 | 414 | 300 | 250 | 403 |
| - | - | - | - | - |
| - | - | - | - | - |
| - | - | - | - | - |
| 3 | 200 | 140 | 60 | 350 |
| 3 | 204 | 141 | 60 | 351 |
| 3 | 209 | 141 | 60 | 352 |
| 3 | 213 | 142 | 60 | 353 |
| - | - | - | - | - |
| - | - | - | - | - |
| - | - | - | - | - |

FIG.6a

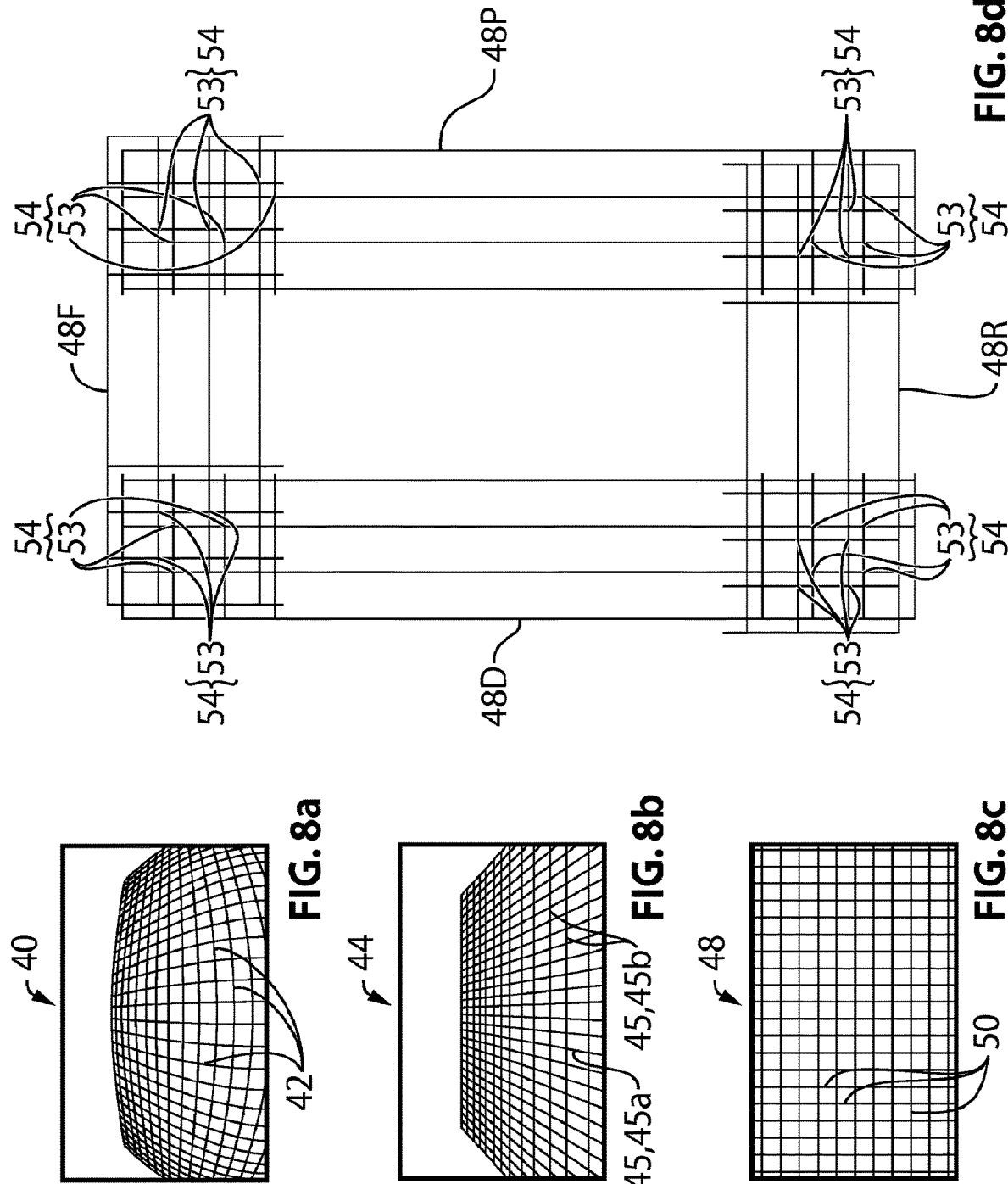

| CAMERA # | ORIGINAL X | ORIGINAL Y | INT1 X | INT1 Y |
|---|---|---|---|---|
| - | - | - | - | - |
| - | - | - | - | - |
| 0 | ### | ### | ### | ### |
| 0 | ### | ### | ### | ### |
| 0 | ### | ### | ### | ### |
| 0 | ### | ### | ### | ### |
| - | - | - | - | - |
| - | - | - | - | - |

← 46

| CAMERA # | ORIGINAL X | ORIGINAL Y | INT1 X | INT1 Y |
|---|---|---|---|---|
| - | - | - | - | - |
| - | - | - | - | - |
| 1 | ### | ### | ### | ### |
| 1 | ### | ### | ### | ### |
| 1 | ### | ### | ### | ### |
| 1 | ### | ### | ### | ### |
| - | - | - | - | - |
| - | - | - | - | - |

← 46

| CAMERA # | ORIGINAL X | ORIGINAL Y | INT1 X | INT1 Y |
|---|---|---|---|---|
| - | - | - | - | - |
| - | - | - | - | - |
| 2 | ### | ### | ### | ### |
| 2 | ### | ### | ### | ### |
| 2 | ### | ### | ### | ### |
| 2 | ### | ### | ### | ### |
| - | - | - | - | - |
| - | - | - | - | - |

← 46

| CAMERA # | ORIGINAL X | ORIGINAL Y | INT1 X | INT1 Y |
|---|---|---|---|---|
| - | - | - | - | - |
| - | - | - | - | - |
| 3 | ### | ### | ### | ### |
| 3 | ### | ### | ### | ### |
| 3 | ### | ### | ### | ### |
| 3 | ### | ### | ### | ### |
| - | - | - | - | - |
| - | - | - | - | - |

| CAMERA # | INT1 X | INT1 Y | INT2 X | INT2 Y |
|---|---|---|---|---|
| - | - | - | - | - |
| - | - | - | - | - |
| 0 | ### | ### | ### | ### |
| 0 | ### | ### | ### | ### |
| 0 | ### | ### | ### | ### |
| 0 | ### | ### | ### | ### |
| - | - | - | - | - |
| - | - | - | - | - |

⟵ 49

| CAMERA # | INT1 X | INT1 Y | INT2 X | INT2 Y |
|---|---|---|---|---|
| - | - | - | - | - |
| - | - | - | - | - |
| 1 | ### | ### | ### | ### |
| 1 | ### | ### | ### | ### |
| 1 | ### | ### | ### | ### |
| 1 | ### | ### | ### | ### |
| - | - | - | - | - |
| - | - | - | - | - |

⟵ 49

| CAMERA # | INT1 X | INT1 Y | INT2 X | INT2 Y |
|---|---|---|---|---|
| - | - | - | - | - |
| - | - | - | - | - |
| 2 | ### | ### | ### | ### |
| 2 | ### | ### | ### | ### |
| 2 | ### | ### | ### | ### |
| 2 | ### | ### | ### | ### |
| - | - | - | - | - |
| - | - | - | - | - |

⟵ 49

| CAMERA # | INT1 X | INT1 Y | INT2 X | INT2 Y |
|---|---|---|---|---|
| - | - | - | - | - |
| - | - | - | - | - |
| 3 | ### | ### | ### | ### |
| 3 | ### | ### | ### | ### |
| 3 | ### | ### | ### | ### |
| 3 | ### | ### | ### | ### |
| - | - | - | - | - |
| - | - | - | - | - |

| CAMERA # | INT2 X | INT2 Y | FINAL X | FINAL Y |
|---|---|---|---|---|
| - | - | - | - | - |
| - | - | - | - | - |
| - | - | - | - | - |
| 0 | ### | ### | ### | ### |
| 0 | ### | ### | ### | ### |
| 0 | ### | ### | ### | ### |
| 0 | ### | ### | ### | ### |
| - | - | - | - | - |
| - | - | - | - | - |
| - | - | - | - | - |
| 1 | ### | ### | ### | ### |
| 1 | ### | ### | ### | ### |
| 1 | ### | ### | ### | ### |
| 1 | ### | ### | ### | ### |
| - | - | - | - | - |
| - | - | - | - | - |
| - | - | - | - | - |
| 2 | ### | ### | ### | ### |
| 2 | ### | ### | ### | ### |
| 2 | ### | ### | ### | ### |
| 2 | ### | ### | ### | ### |
| - | - | - | - | - |
| - | - | - | - | - |
| - | - | - | - | - |
| 3 | ### | ### | ### | ### |
| 3 | ### | ### | ### | ### |
| 3 | ### | ### | ### | ### |
| 3 | ### | ### | ### | ### |
| - | - | - | - | - |
| - | - | - | - | - |
| - | - | - | - | - |

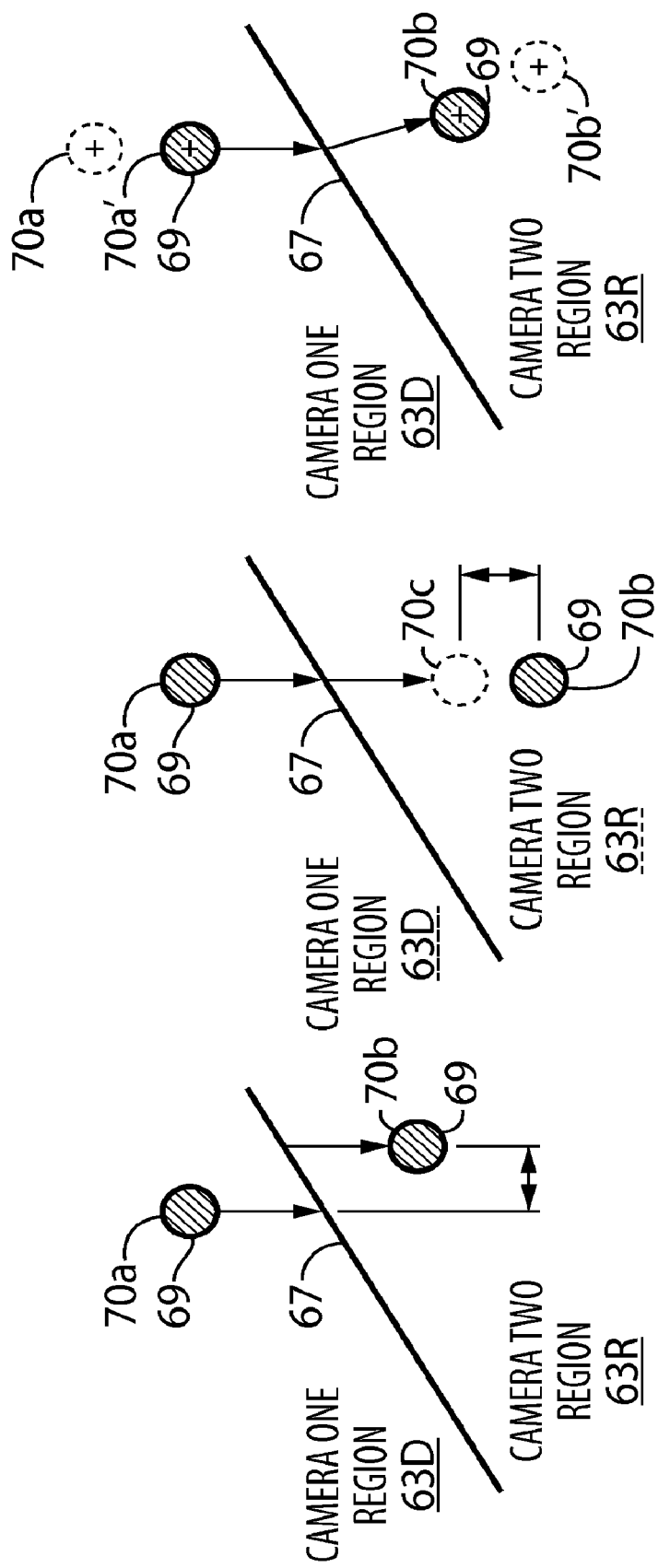

METHOD FOR DETERMINING ALIGNMENT OF VEHICULAR CAMERAS

CROSS REFERENCE TO RELATED APPLICATIONS

The present application is continuation of U.S. patent application Ser. No. 13/990,902, filed May 31, 2013, now U.S. Pat. No. 9,900,522, which is a 371 national phase application of PCT Application No. PCT/US2011/062834, filed Dec. 1, 2011, which claims the priority benefit of U.S. provisional applications, Ser. No. 61/482,786, filed May 5, 2011, and Ser. No. 61/418,499, filed Dec. 1, 2010.

FIELD OF THE INVENTION

The present invention relates to multi-camera systems for use in vehicles, and more particularly multi-camera systems for use in vehicles wherein image manipulation is carried out on the images prior to displaying the images to a vehicle occupant.

BACKGROUND OF THE INVENTION

There are few multi-camera systems currently available in vehicles. Such systems incorporate four cameras typically, and provide a vehicle occupant with a composite image that is generated from the images taken by the four cameras. However, such systems can require a relatively large amount of processing power to generate the image that is displayed to the vehicle occupant, particular in situations where there is manipulation of the images being carried out. Such manipulation of the images may include dewarping, among other things.

It would be beneficial to provide a multi-camera system for a vehicle that requires relatively little processing power.

SUMMARY OF THE INVENTION

In a first aspect, the invention is directed to a method of establishing a composite image for displaying in a vehicle, comprising:

a) providing a first camera and a second camera, each camera having a field of view;

b) positioning the cameras so that the fields of view of the cameras overlap partially, wherein the cameras together have a combined field of view;

c) recording preliminary digital images from the cameras, each preliminary digital image being made up of a plurality of pixels; and d) generating a final composite digital image that corresponds to a selected digital representation of the combined field of view of the cameras by remapping selected pixels from each of the preliminary digital images into selected positions of the final composite digital image.

In a second aspect, the invention is directed to a method of establishing a composite image for displaying in a vehicle, comprising:

a) providing a first camera and a second camera, a third camera and a fourth camera, each camera having a field of view, wherein the cameras together have a combined field of view that is a 360 degree field of view around the vehicle;

b) positioning the cameras so that the field of view of each camera overlaps partially with the field of view of two of the other cameras;

c) recording preliminary digital images from the cameras, each preliminary digital image being made up of a plurality of pixels; and d) generating a final composite digital image that corresponds to a selected digital representation of the combined field of view of the cameras by remapping selected pixels from each of the preliminary digital images into selected positions of the final composite digital image, wherein the preliminary digital images each have associated therewith a preliminary apparent camera viewpoint and the final composite digital image has associated therewith a final apparent camera viewpoint, and wherein the selected pixels from the preliminary digital images are selected so that the final apparent camera viewpoint associated with the final composite digital image is higher than the preliminary apparent camera viewpoints associated with the preliminary digital images, and wherein the selected pixels from the preliminary digital images are selected so that any misalignment between the overlapping portions of the preliminary digital images is substantially eliminated, and wherein the selected pixels from the preliminary digital images are selected so that the final composite digital image is dewarped as compared to each of the preliminary digital images.

In a third aspect, the invention is directed to a system for establishing a composite image for displaying in a vehicle, comprising a first camera and a second camera and a controller. Each camera has a field of view that overlaps partially with the field of view of the other camera. Each camera has an imager for generating a preliminary digital image. The cameras together have a combined field of view. The controller is programmed to generate a final composite digital image that corresponds to a selected digital representation of the combined field of view of the cameras by using a remapping table to remap selected pixels from each of the preliminary digital images into selected positions of the final composite digital image.

In a fourth aspect, the invention is directed to a method of generating a remapping table for use in mapping pixels from a plurality of preliminary digital images into a final composite image, comprising:

a) driving a vehicle having a first camera and a second camera thereon, each camera having a field of view that overlaps partially with the field of view of the other camera, each camera having an imager for generating one of the preliminary digital image, wherein the cameras together have a combined field of view, wherein the vehicle further includes a controller;

b) detecting a target feature along the path of the vehicle during driving, using the controller;

c) providing a first preliminary digital image from the first camera, wherein the first preliminary digital image contains a first representation of the target feature at a first point time;

d) determining the position of the first representation of the target feature in the first preliminary digital image;

e) providing a second preliminary digital image from the second camera, wherein the second preliminary digital image contains a second representation of the target feature at a second point time;

f) determining the position of the second representation of the target feature in the second preliminary digital image;

g) comparing the positions of the first and second representations of the target feature; and h) generating at least one value for the remapping table based on the result of the comparison in step g).

BRIEF DESCRIPTION OF THE DRAWINGS

The present invention will now be described by way of example only with reference to the attached drawings, in which:

FIG. 6a is remapping table used to generate the final composite image shown in FIG. 5 from the images shown in FIGS. 3a-3d;

FIG. 6b is a graphical representation of the remapping that takes place using the remapping table shown in FIG. 6a;

FIG. 8a is a preliminary image from a camera from the camera system shown in FIG. 1;

FIGS. 8b and 8c are images formed by progressive remapping of the image shown in FIG. 8a;

FIG. 8d illustrates the analysis performed by the camera system shown in FIG. 1, to stitch together several remapped images;

FIGS. 9a-9c are remapping tables used to generate the images shown in FIGS. 8b, 8c and 8e from the preliminary image shown in FIG. 8a;

FIGS. 12a-12c are illustrations of events that would trigger adjustment of the remapping values used to generate the composite image shown in FIG. 3.

DETAILED DESCRIPTION OF THE INVENTION

Figure 1:
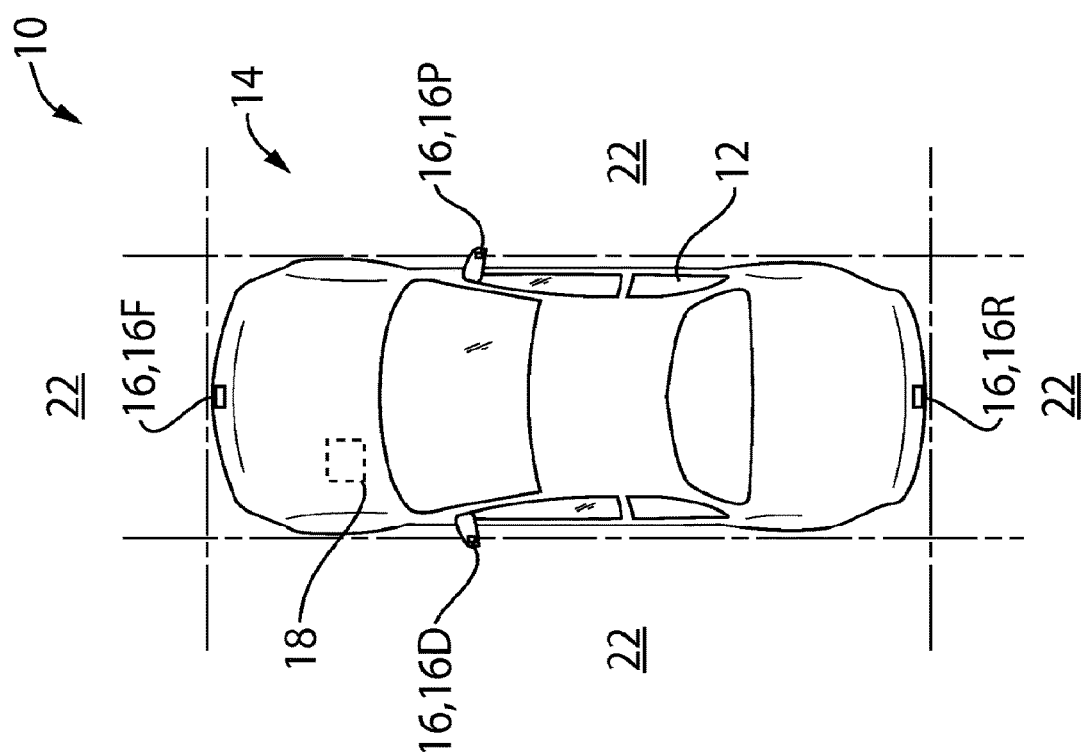
FIG. 1 is a plan view of a vehicle with a camera system in accordance with an embodiment of the present invention.

Reference is made to FIG. 1, which shows a vehicle 10 that includes a vehicle body 12, and a multi-camera system 14 in accordance with an embodiment of the present invention. The multi-camera system 14 includes four cameras 16 and a controller 18. The multi-camera system 14 is configured to display a composite image that is generated using all four cameras 16 on an in-cabin display, shown at 20 in FIG. 2. The four cameras 16 include a front camera 16F, a rear camera 16R, and driver's side and passenger side cameras 16D and 16P.

Figure 2:
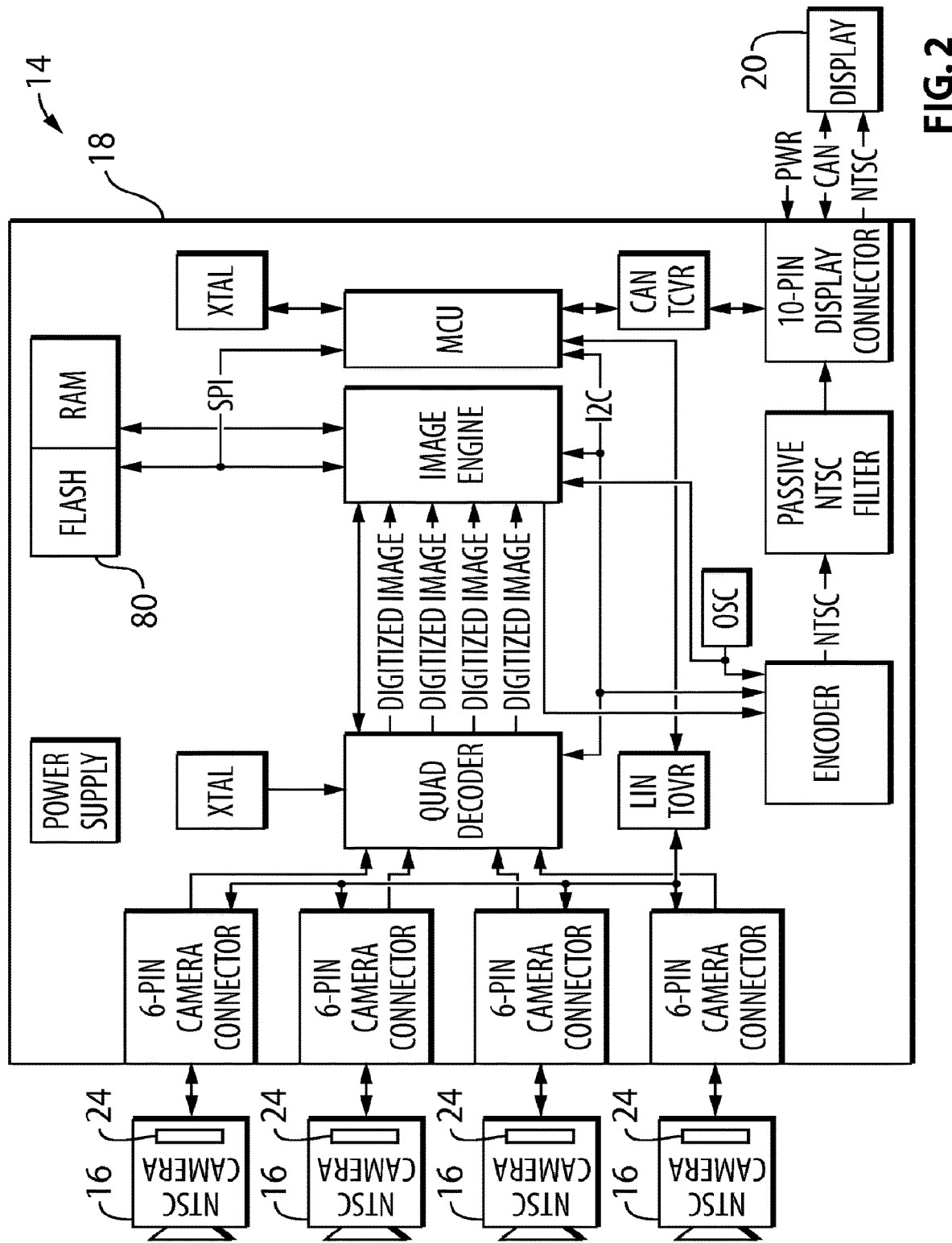
FIG. 2 is a schematic illustration of the camera system shown in FIG. 1.
Figure 3A:
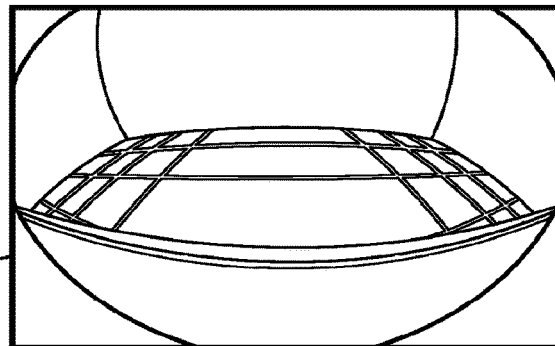
FIGS. 3a-3d are images taken by cameras that are part of the camera system shown in FIG. 1.
Figure 3C:
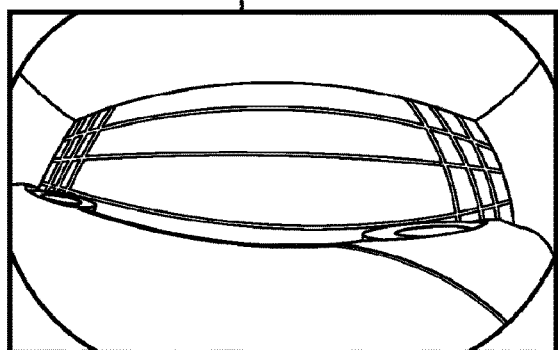
Figure 3D:
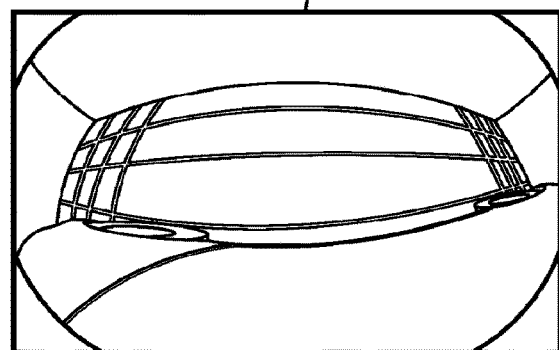
Figure 3B:
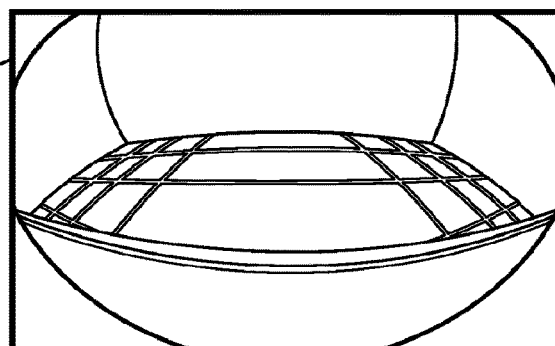

Referring to FIG. 1, each camera 16 has a field of view 22. The field of view of each camera 16 overlaps with the fields of view 22 of the two cameras 16 on either side of it. Preferably, the field of view of each camera 16 is at least about 185 degrees horizontally. Referring to FIG. 2, each camera 16 includes an image sensor 24, which is used to generate a digital image taken from the camera's field of view 22. The image sensor 24 may be any suitable type of image sensor, such as, for example a CCD or a CMOS image sensor.

The digital image generated from the image sensor 24 may be referred to as a preliminary digital image, an example of which is shown at 26 in FIGS. 3a-3d. FIGS. 3a-3d show the preliminary digital images 26 from the four cameras 16. The images 26 are correspondingly identified individually at 26F, 26R, 26D and 26P.

Figure 4:
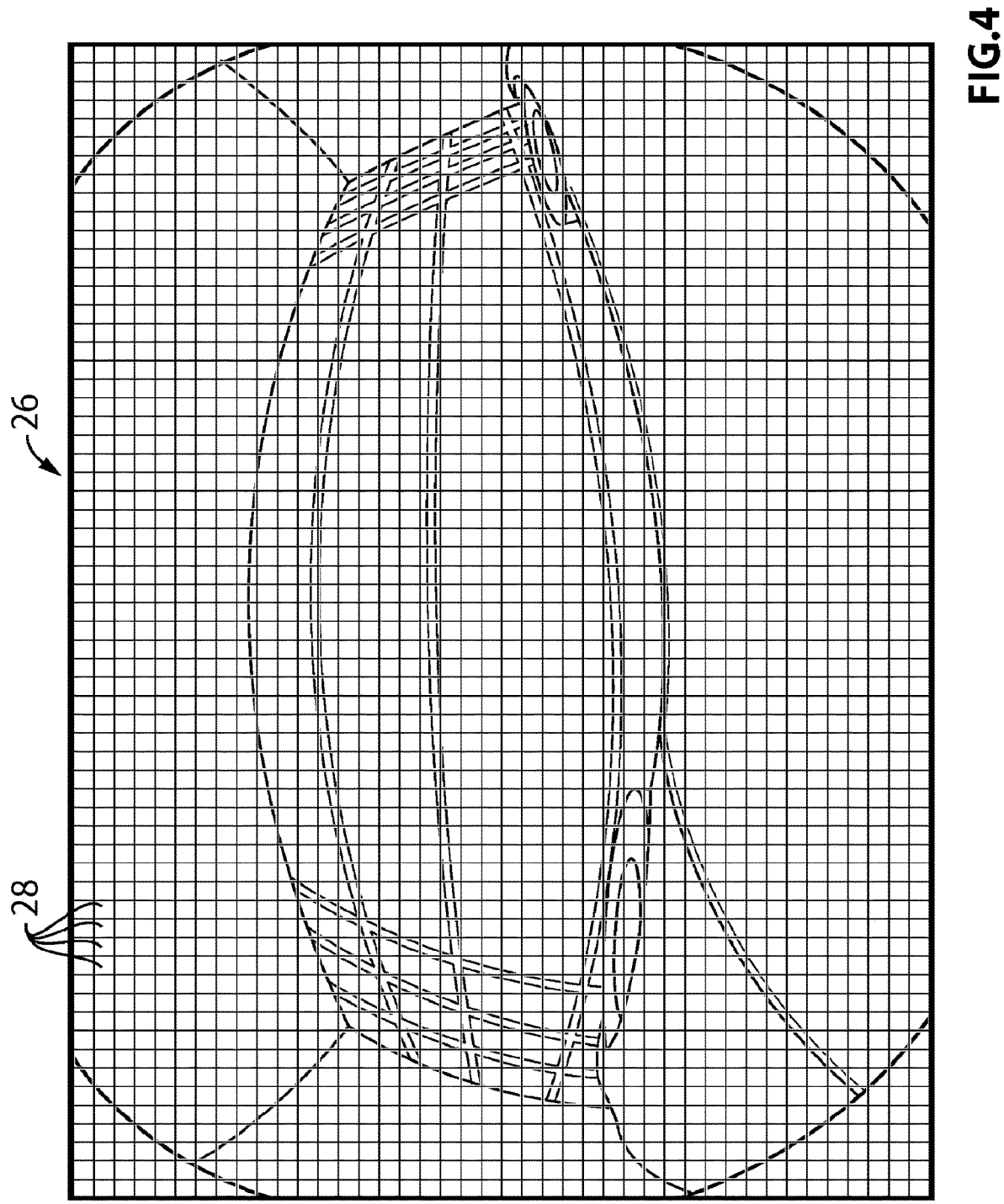
FIG. 4 is a magnified view of the image shown in FIG. 3d.

Each preliminary digital image 26 is made up of a plurality of pixels, which are shown at 28 in the magnified image shown in FIG. 4. It will be noted that the pixels 28 are enlarged in FIG. 4 for the sake of clarity. The actual image sensor 24 may have any suitable resolution. For example it may generate a digital image that is 640 pixels wide by 480 pixels high, or optionally an image that is 720 pixels wide×480 pixels high, or an image that is 1280 pixels wide×960 pixels high or even higher. The output signals from the cameras 16 to the controller 18 may be in analog form such as in NTSC or PAL format, or in digital form using, for example LVDS format, or Ethernet.

Figure 5:
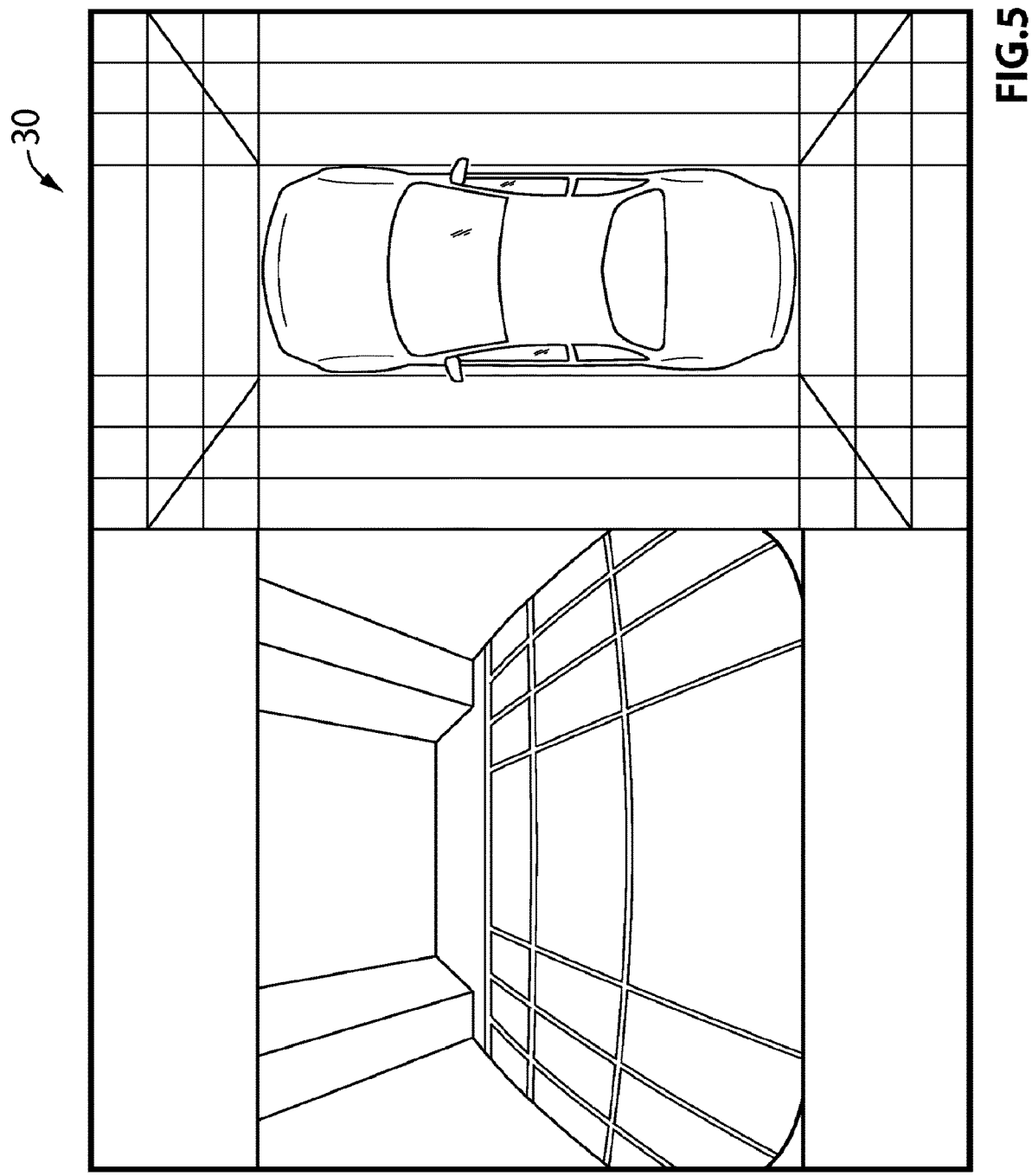
FIG. 5 is a composite final image generated by the camera system shown in FIG. 1.

The controller 18 is programmed to generate a final composite digital image, shown at 30 in FIG. 5, that corresponds to a selected digital representation of the combined field of view of the cameras 16 by using a remapping table 32 shown in FIG. 6a to remap selected pixels 28 from each of the preliminary digital images 26 into selected positions of the final composite digital image 30.

The digital representation may incorporate one or more operations on the original preliminary digital images 26. For example, the pixels 28 from the original images 26 may be remapped in such a way as to dewarp the images 26. As can be seen in FIG. 5, the warpage present in the images 26 is reduced (in this case it is substantially eliminated) in the final composite digital image 30.

Another operation that may be carried out through the remapping is viewpoint adjustment. Each preliminary digital image 26 has associated therewith, an apparent viewpoint, which is the viewpoint from which the camera 16 appears to have captured the image 26. In the preliminary digital images 26, the apparent viewpoint of the camera 16 is the same as the actual viewpoint of the camera 16 because no manipulation of the image 26 has been carried out. However, it may be preferable, when presenting a 360 degree view around the vehicle to the vehicle driver, to present a bird's eye view. To accomplish this, the perspective of the image is adjusted by adjusting the relative sizes of portions of the preliminary images when remapping them to the final composite image 30. For example, the objects that are closer to the camera 16 appear larger in the image 26 than objects that are farther from the camera 16. After the apparent viewpoint has been raised however, as shown in the final digital image 30, objects closer to the camera 16 are shrunk so that they are not larger than objects farther from the camera 16.

Figure 6B:
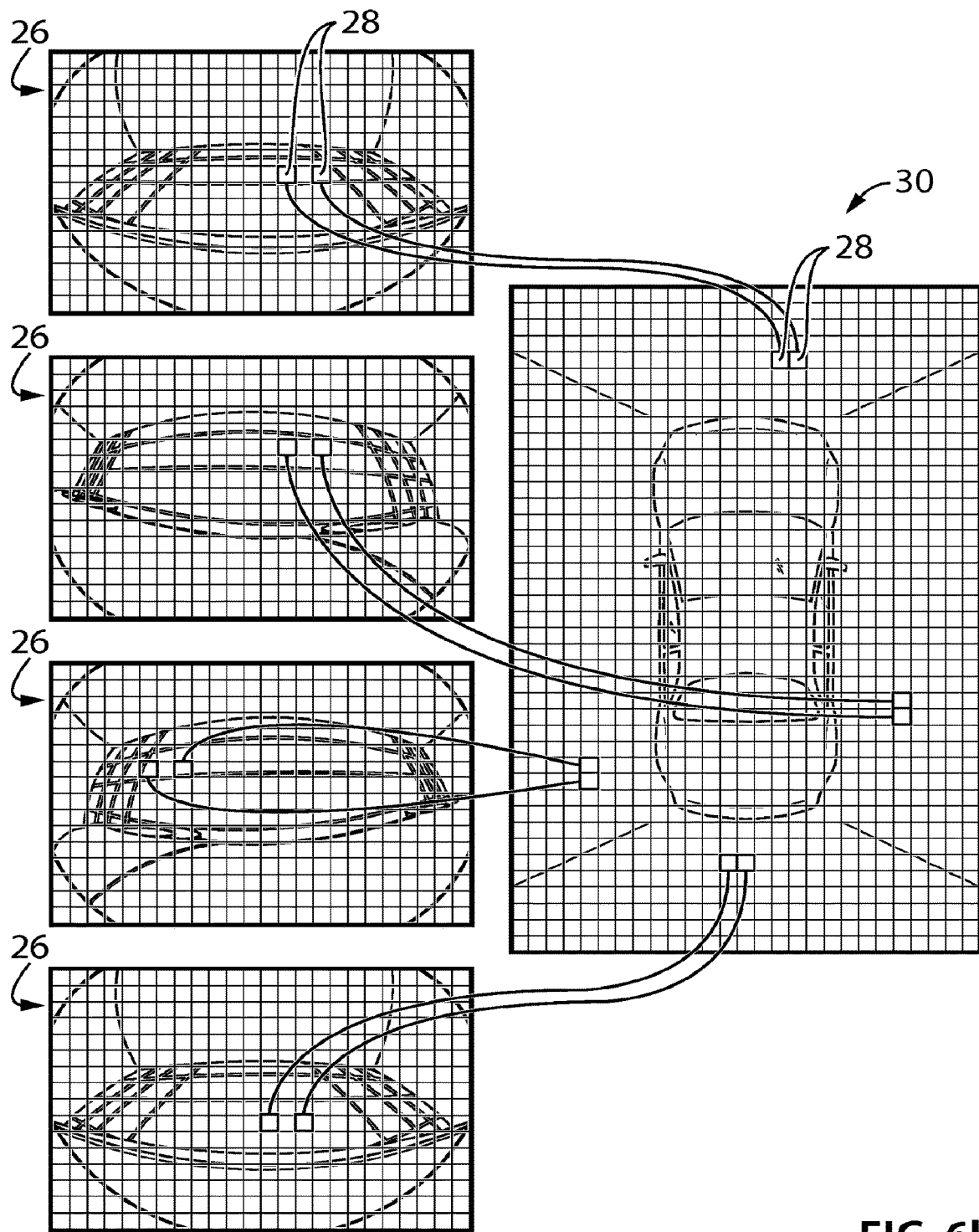

A graphical representation of the remapping that is carried out is shown in FIG. 6b. In the exemplary embodiment of the present invention, the preliminary digital images 26 were of sufficiently high resolution as compared to the resolution of the final composite image 30 that there is not a need for the controller to 'stretch' portions of the preliminary images 26 when generating the map for pixels in the final image 30. In other words, in this particular embodiment, the controller 18 is not required to process a row of 10 pixels from the preliminary image 26 and convert it to a row of 20 pixels in the final image 30. Thus, no pixels in the final image 30 are 'fabricated' or generated by the controller 18. Put another way, the preliminary images 26 are of sufficiently high resolution that the image manipulation that is carried out to arrive at the final composite image 30 involves varying amounts of compression of portions of the preliminary image (i.e. removing or skipping pixels), but does not involve stretching of any portions of the preliminary image (which could involve interpolating between pixels and thus 'creating' pixels). It is conceivable, however, that the preliminary images would be of relatively lower resolution such that the controller 18 would be relied upon in some instances to stretch portions of the preliminary images 26 when creating the final composite image 30. It will be noted that in the exemplary embodiment, the resolution of each of the preliminary images is 720 pixels wide by 480 pixels high, while the resolution of the final composite image is about 320 pixels wide by 480 pixels high. As can be seen in the image in FIGS. 5 and 6b, a representation of the vehicle 10 itself is inserted in the final composite image 30. While it is preferred that none of the pixels in the final image 30 be 'created' through interpolation between adjacent pixels, it is contemplated that in certain situations some pixels may be generated that way (i.e. by interpolating between adjacent pixels) so as to provide a relatively smooth transition between them.

Referring to FIG. 5, in the exemplary embodiment, given that the final composite image 30 is only 320 pixels wide, a somewhat-dewarped rear view is also displayed on the display 20 for the vehicle driver, adjacent the 360 degree view.

Figure 6C:
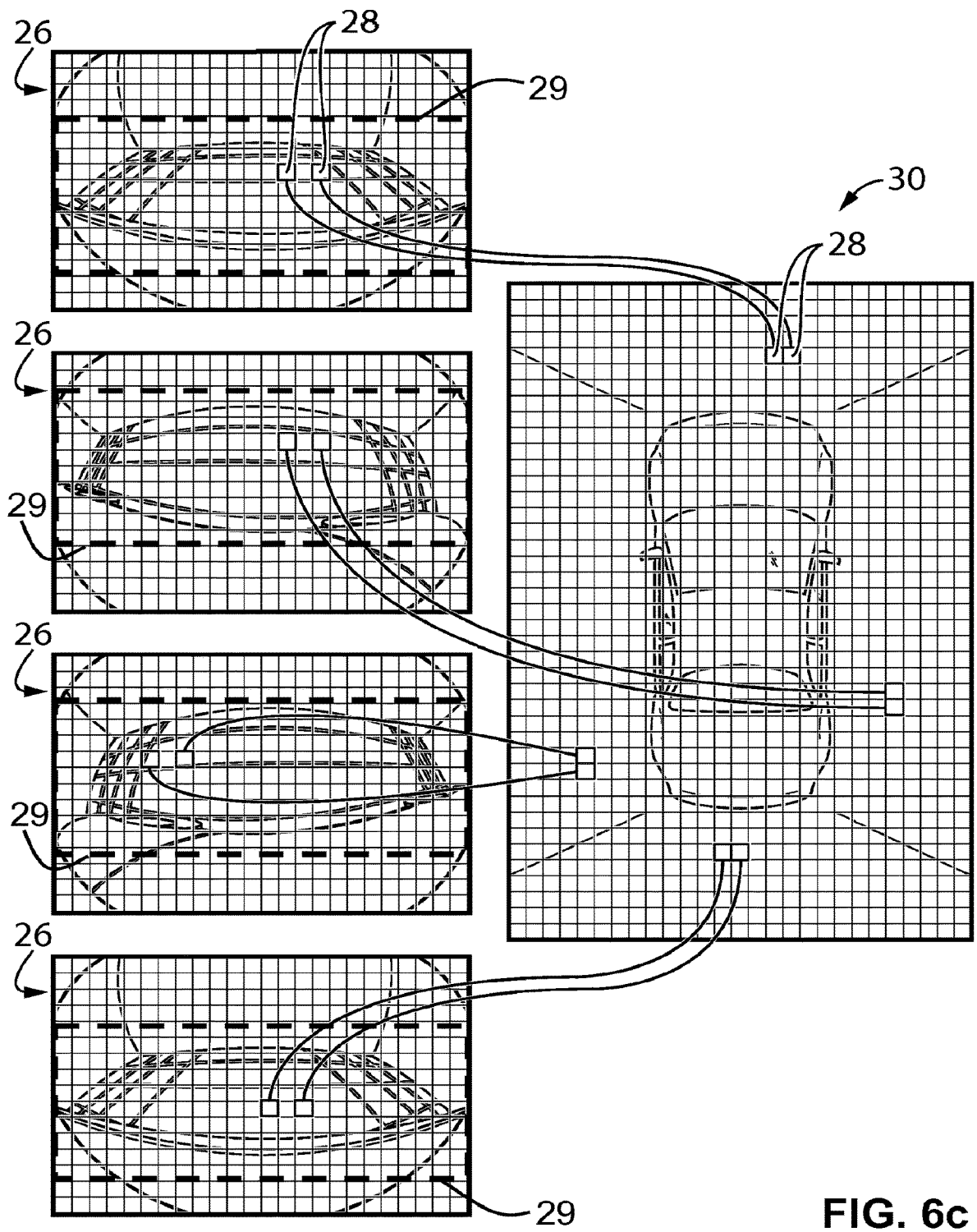
FIG. 6c is a graphical representation of a step that takes place prior to the remapping illustrated in FIG. 6b.

Referring to FIG. 6c, in some cases, the portion of the preliminary digital image 26 from each individual camera that is used as part of the final composite image 30 may be a selected subset of the pixels of the preliminary digital image 26. The particular subset used from each preliminary digital image is shown in a dashed box shown at 29 and will vary in position from camera to camera. It will be noted that the dashed box represents the subset of pixels of the associated preliminary digital image 26 that is involved in the generation of image 30, which, for greater certainty, is not to say that each pixel from subset 29 necessarily will be a pixel in the image 30—rather it is to say that the image 30 contains pixels that relate to or are taken from portion 29 and not to the portion of the preliminary digital image that is outside portion 29. The rest of the image pixels (i.e. the pixels that are outside the portion 29 that is used to generate the composite image 30) are not needed and can be discarded. Only the pixels in the portions 29 are streamed into the memory of the image engine (which is what the module involved in generating the composite image 30 using the methods described herein may be referred to). By discarding those pixels that are outside the portions 29, the memory bandwidth in image engine can be reduced, so that a slower memory can be utilized which may advantages in terms of reducing system cost, and/or increasing reliability.

Aspects of the calibration of the multi-camera system 14 will now be discussed. This calibration is used in order to assist in determining the remapping values in the remapping table 32 (FIG. 6a).

Figure 7:
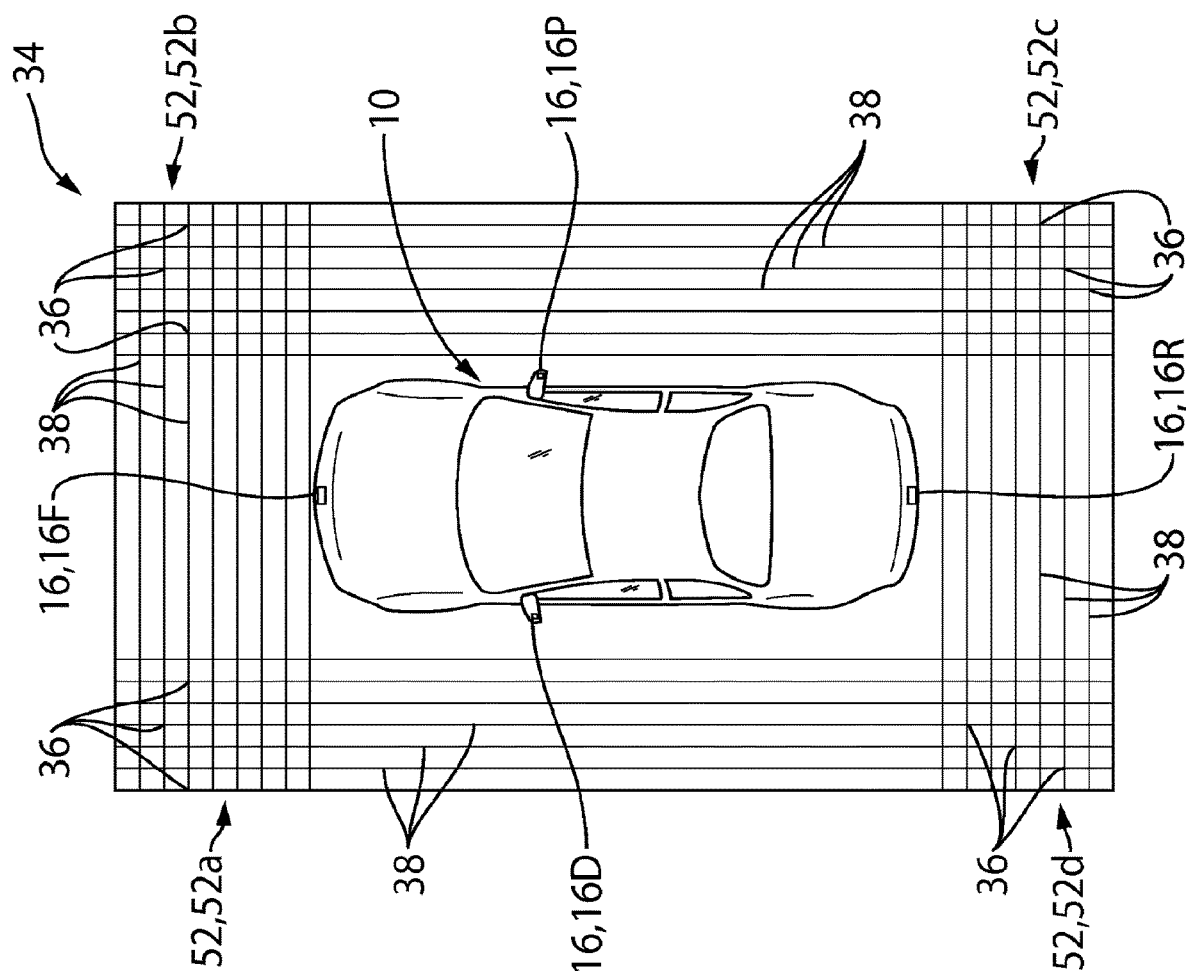
FIG. 7 is a plan view of a vehicle in a test area use to calibrate the camera system shown in FIG. 1.

Initially, the cameras 16 are mounted to the vehicle body 12 and the vehicle 10 is positioned at a location (as shown in FIG. 7) whereat there is a predetermined test arrangement 34 of alignment landmarks 36, and dewarping landmarks 38.

Figure 8E:
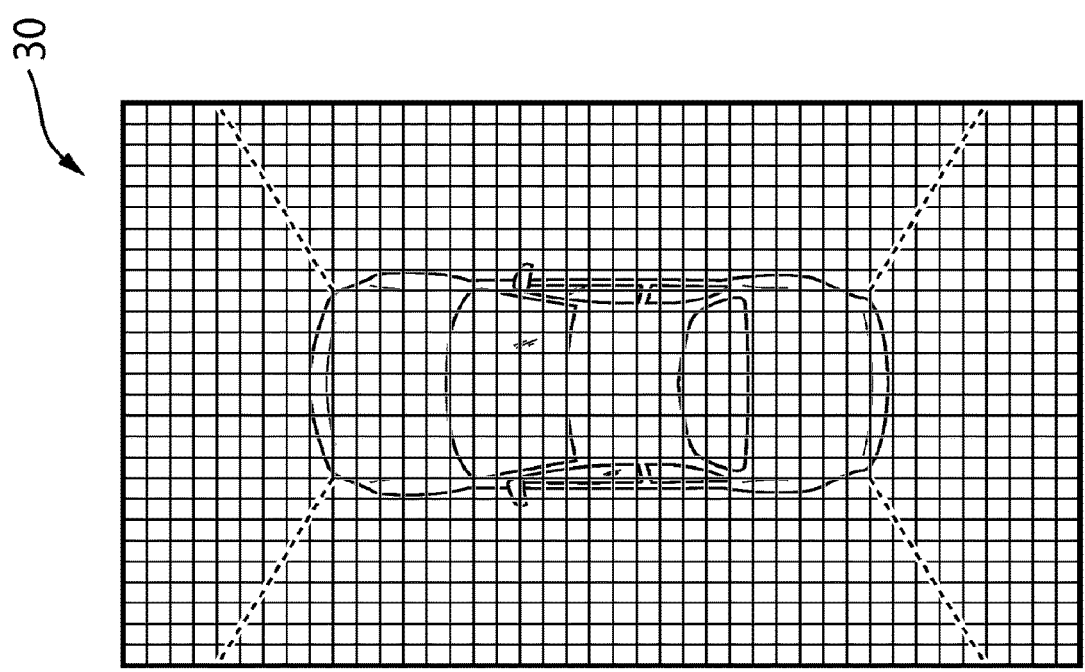
FIG. 8e is a final composite image generated using the analysis shown in FIG. 8d.

In the exemplary test arrangement 34 shown in FIG. 7, it can be seen that the landmarks 38 are straight lines. The preliminary digital image from one of the cameras 16 (e.g., the rear camera) is shown at 40 in FIG. 8a. Three functions are carried out on the preliminary digital images 40 to prepare the final composite image 30 shown in FIG. 8e. The functions are: dewarping, viewpoint adjustment, and offset correction. These functions may be carried out sequentially, and an intermediate remapping table may be generated in association with each function. Referring to FIG. 8a, it can be seen that there is substantial warping in the representations 42 of the landmarks 38 in the preliminary digital image 40. Knowing that the actual landmarks 38 are straight lines, this warping can be compensated for when determining the remapping of the pixels from the preliminary digital image 40 into the dewarped intermediate image shown at 44 in FIG. 8b. As can be seen, the representations shown at 45 of the landmarks 38 are dewarped substantially completely. The remapping necessary to generate the dewarped image 44 may be stored in a first intermediate remapping table shown at 46 in FIG. 9a. It will be understood that a preliminary digital image 40 from each camera 16 will be dewarped to generate a dewarped image 44 and so four first intermediate remapping tables 46 will be generated (i.e. one table 46 for each camera 16).

The dewarped image 44 may then be viewpoint adjusted so as to move the apparent viewpoint of the camera 16 upwards to generate a resulting 'dewarped and viewpoint-adjusted' image 48 in FIG. 8c, using a second intermediate remapping table shown at 49 in FIG. 9b. The remapping data to be inserted in the second intermediate remapping table 49 may be generated relatively easily by determining what adjustments need to be applied to the longitudinal representations 45a to make them parallel to each other, what adjustments need to be applied to the transverse representations 45b to make them parallel to each other (in this case virtually no adjustment in that regard is required), what adjustments need to be applied to the representations 45 so that they are spaced appropriately from each other, and to make the longitudinal representations 45a extend perpendicularly to the transverse representations 45b, so as to match the known angles at which the actual longitudinal landmarks 38 intersect with the actual transverse landmarks 38. It will be understood that each image 44 will be viewpoint-adjusted to generate a dewarped and viewpoint-adjusted image 48 and so four second intermediate remapping tables 49 will be generated. The representations of the landmarks 38 in FIG. 8c are shown at 50.

The dewarped and viewpoint-adjusted image 48 shown in FIG. 8c from one camera 16 may be compared to the other dewarped and viewpoint-adjusted images 48 from the other cameras 16 to determine whether there is any offset adjustment necessary. This comparison is illustrated in FIG. 8d. The versions of the images 48 shown in FIG. 8d have been greatly simplified and only include a few representations 50 of landmarks 38 and representations 54 of landmarks 36, so as to facilitate explanation and illustration of the comparison that is being carried out. It will be understood however, that the actual comparison that is carried out may be done with all of the representations 50 in the images 48 shown in FIG. 8c.

As can be seen in FIG. 7, the alignment landmarks 36 are arranged in groups 52, shown individually at 52a, 52b, 52c and 52d. Each group 52 is visible to at least two of the cameras 16. As shown in FIG. 8d, each image 48 contains representations 53 of some of the alignment landmarks 36. The groups of representations are identified at 54. It can be seen that the images shown at 48F (front) and 48D (drivers side) both contain representations 54 of the group 52a of landmarks 36. Similarly the images shown at 48F and 48P (passenger side) both contain representations 54 of the group 52b of landmarks 36. Similarly the images shown at 48P and 48R (rear) both contain representations 54 of the group 52c of landmarks 36. Finally, the images shown at 48R and 48D both contain representations 54 of the group 52d of landmarks 36. An X axis and a Y axis are shown at 56 and 58 respectively in FIG. 8d. The X axis and Y axis offsets between the representations 54 of group 52a in image 48F and the representations 54 of group 52a in image 48D are determined, and these offsets can be taken into account when remapping pixels from these two images 48 into the final composite image 30 shown in FIG. 8e to ensure that the final composite image 30 transitions smoothly from pixels taken from image 48F to pixels taken from image 48D. Similarly, the offsets can easily be determined between the representations 54 shown in any two adjacent images 48, and this information can be taken into account when remapping the pixels from the images 48 into the final composite image 30. The remapping information from the images 48 to the final composite image 30 may be stored in a third intermediate remapping table 60 shown in FIG. 9c. It will be understood that only a single remapping table 60 is generated, which remaps pixels from each of the four images 48 into the final composite image 30.

Once the four first remapping tables 46, the four second remapping tables 49 and the third remapping table 60 are generated, the remapping table 32 shown in FIG. 6a can be generated by combining the remapping information in all these tables 46, 49 and 60. Once generated, the remapping table 32 may be stored in the permanent storage memory (shown at 80 in FIG. 2) that is part of the camera system 14.

However, the controller 18 may additionally store one or more of the individual remapping tables for use in generating and displaying an intermediate image. For example, it may be desired to show a dewarped rear view from the vehicle 10 in some instances, such as when the driver is backing the vehicle 10 up. The preliminary digital image 40 from the rear camera 16 can be remapped quickly and easily using the first intermediate remapping table 46 to generate the dewarped rear view image 44. Other viewing modes are also possible and would benefit from having one or more of the intermediate remapping tables stored in the memory 80. For example, a split view showing images from the driver's side and passenger side cameras could be provided.

In the above example, the test arrangement 34 of landmarks 36 and 38 were provided as images painted on the floor of an indoor test area. It will be noted that other means of providing the test arrangement 34 can be provided. For example, the test arrangement can be provided on mats place on the floor of the test area. Alternatively, the test arrangement 34 could projected on the floor of the test area using any suitable means, such as one or more lasers, or one or more projectors, or some combination of both.

In the example described above, four cameras are used to generate a 360 degree view around the vehicle, using pixel remapping. It will be understood that the advantages of pixel remapping are not limited to camera systems that employ four cameras. For example, in an alternative embodiment that is not shown, the vehicle may include cameras 16 mounted at each of the front corners and each of the rear corners of the vehicle. Depending on whether the vehicle is leaving a parking spot by driving forward or by backing up, the two front corner cameras or the two rear corner cameras could be used to form a view that shows cross-traffic in front and to the sides of the vehicle, or behind and to the sides of the vehicle depending on whether the vehicle is driving forward or backing up. In such an embodiment, a final composite image can be generated using pixel remapping, but would be generated based on images from only two cameras (i.e. the cameras at the two front corners of the vehicle, or alternatively the cameras at the rear two corners of the vehicle).

It will be noted that, while the lines 38 in the test arrangement have been shown as straight lines, they need not be. They may be any suitable selected shape, which is then compared to its representation in the images 40 and 44 to determine how to remap the pixels to reduce warping and to carry out viewpoint adjustment.

In the test arrangement 34 shown in FIG. 7 the alignment landmarks 36 are the intersections between the lines 38. It will be understood however that the alignment landmarks could be other things, such as, for example, a group of unconnected dots arranged in a selected arrangement (e.g., arranged to form a square array).

The above description relates to the calibration of the camera system 14 in a controlled environment using a test arrangement 34 to generate the remapping table 32 for storage in the memory 80.

Figure 10:
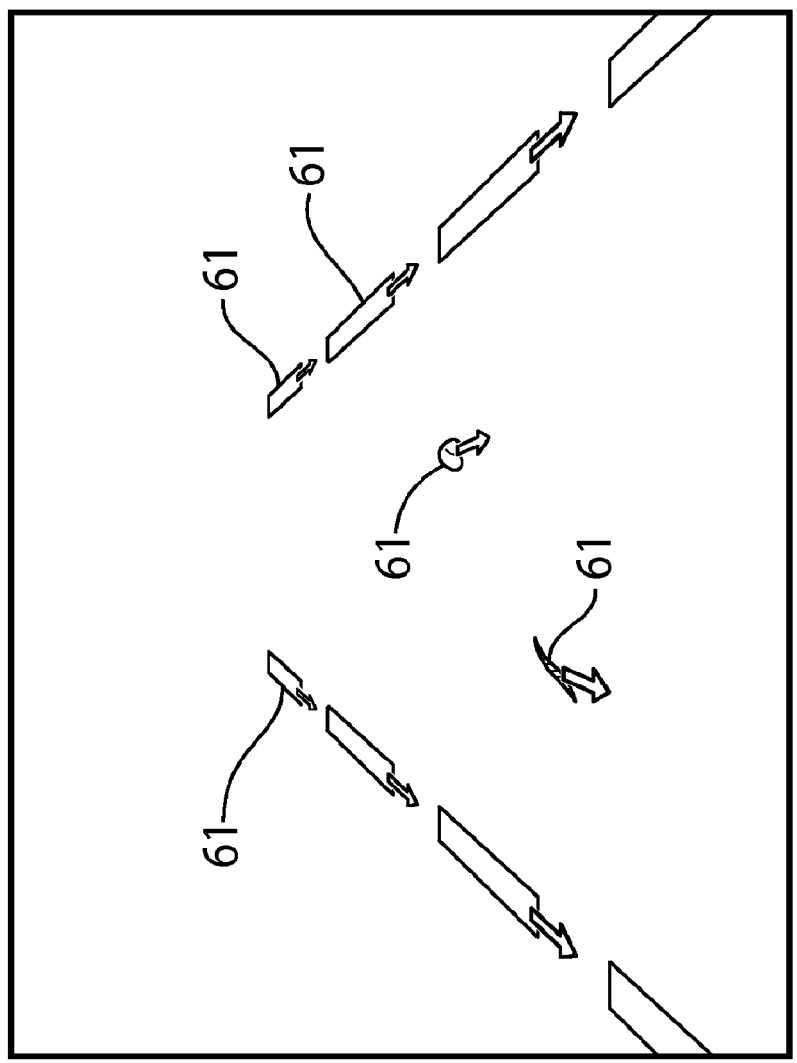
FIG. 10 shows target features on a road that can be used to assist in calibrating the camera system shown in FIG. 1 during driving.

It may be desirable to permit the controller 18 to calibrate or recalibrate the camera system 14 during driving. To do this, the controller 18 identifies a target feature that appears in an image from one of the cameras 16. The target feature is shown in FIG. 10 at 61 and may be, for example, a crack in the pavement, a lane marker or a piece of gravel. In FIG. 10 numerous examples of possible target features are shown, although the controller 18 need only work with one target feature 61 that will pass on one side of the vehicle, in order to calibrate three of the cameras 16 to each other (i.e. the front camera, the camera on whichever side of the vehicle that the target feature 61 will pass, and the rear camera). At least one target feature 61 needs to be identified that will pass on the other side of the vehicle 10 (although not necessarily at the same time as the first target feature 61), in order to calibrate the camera on the other side of the vehicle to the other three cameras.

Figure 11:
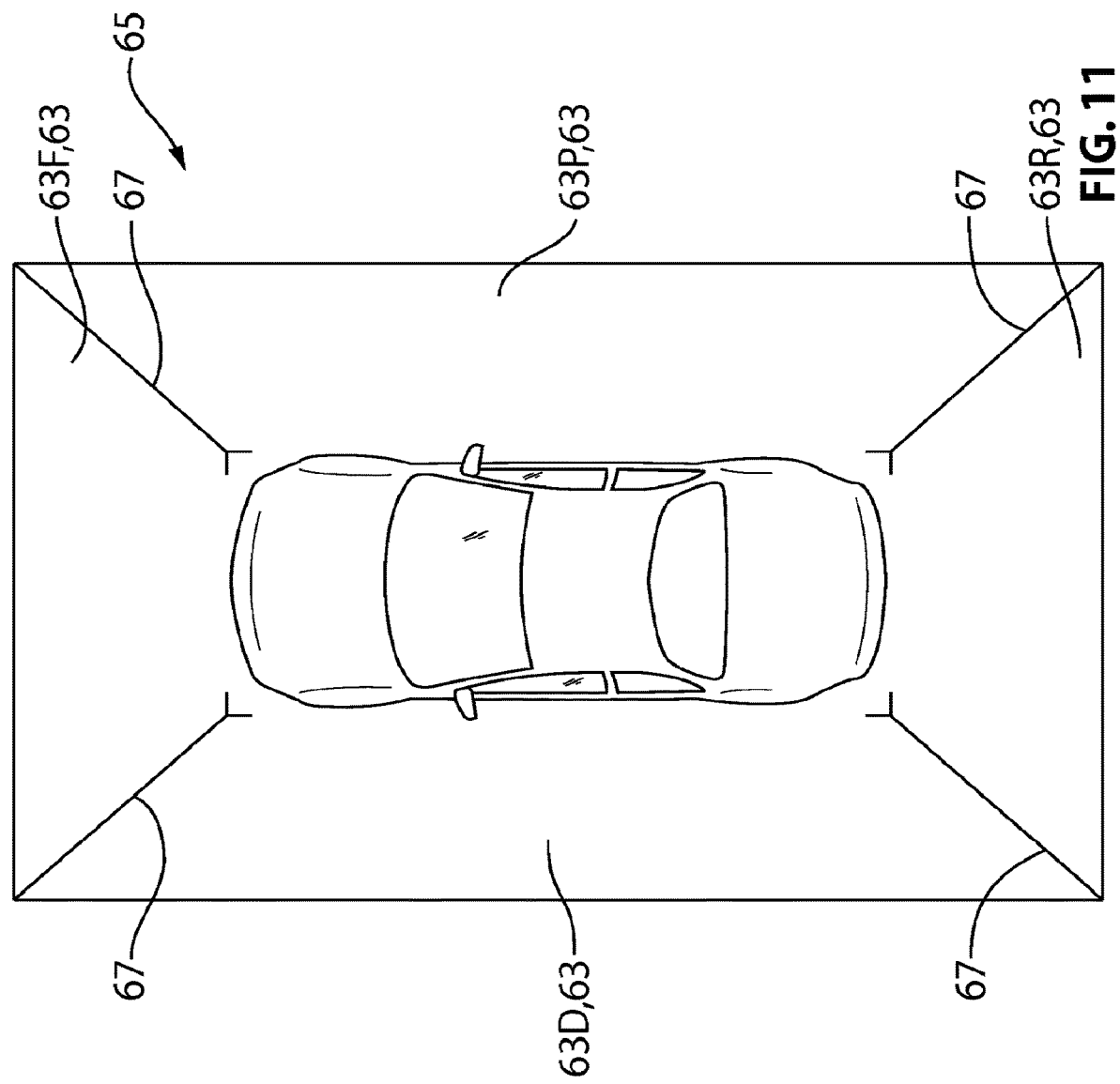
FIG. 11 is a composite image formed using default remapping values, prior to the calibration of the camera system shown in FIG. 1 during drive.

As the vehicle 10 is driven (preferably below a selected speed) past the target feature 61, the target feature 61 moves through the field of view of the front camera 16, through the field of view of one of the side cameras 16 and finally through the field of view of the rear camera 16. A representation of the target feature 61 will thus move through images from the front camera 16, then through images from one of the side cameras 16, and then through images from the rear camera 16. By analyzing the movement of the representation of the target feature 61 (e.g. its position, its direction of travel and its speed of movement) particularly as it transitions from images from one camera into the images from a subsequent camera the controller 18 can determine X and Y offsets, angular offsets, differences in scale, and possibly other differences, between images from one camera and another. This analysis may be carried out as follows: The controller 18 may start with a default set of remapping values for the remapping table 32 to generate a final composite image 30 from the four images. This default set of remapping values may be based on a simple algorithm to crop the preliminary digital images as necessary, rotate them as necessary and scale them as necessary to fit them in allotted zones 63 (shown individually at 63F, 63R, 63D and 63P) of a preliminary composite image 65 shown in FIG. 11. Optionally the default remapping values may also achieve dewarping and viewpoint adjustment, based on information obtained during testing in a test area similar to the test area shown in FIG. 7. Alternatively, the default remapping values may be the values in the remapping table 32 from a previous calibration (e.g. a calibration performed at a test area shown in FIG. 7, or a previous calibration performed during driving). As shown in FIG. 11, demarcation lines shown at 67 show the boundaries between the zones 63.

FIGS. 12a, 12b and 12c show two adjacent zones 63 and the demarcation line 67 between them, to illustrate the analysis of the movement of the representation of the target feature 61. The adjacent zones in FIGS. 12a, 12b and 12c, are zones 63D and 63R. It will be understood however, that these figures are provided solely to illustrate the analysis that is carried out by the controller 18 on the movement of the representation of the target feature 61 between all applicable pairs of adjacent zones 63.

In FIGS. 12a-12c, the representation is shown at 69 and is shown at two different instants in time in each of the FIGS. 12a-12c. The position of the representation 69 at the first, earlier instant of time is shown at 70a, and at the second, later instant of time at 70b. At the first instant in time, the representation 69 is in the zone 63D. At the second instant of time, the representation 69 is in the zone 63R.

While tracking the movement of the representation 69, if the controller 18 detects that the representation 69 shifts horizontally by some amount of pixels (as shown in FIG. 12a) as it crosses the demarcation line 67 (by comparing the positions 70a and 70b of the representation 69 at the two instants in time), then the controller 18 can adjust the remapping values accordingly for one or both of the images that are mapped to the zones 63D and 63R.

With reference to FIG. 12b, while tracking the movement of the representation 69, the controller 18 may store an expected position 70c for the representation 69 at the second instant of time, based on the speed and direction of travel of the representation 69. The controller 18 may compare the actual detected position 70b of the representation 69 at the second instant of time with the expected position 70c of the representation 69 at the second instant of time, and, if there is a vertical offset, the controller 18 can adjust the remapping values accordingly for one or both of the images that are mapped to the zones 63D and 63R.

With reference to FIG. 12c, while tracking the movement of the representation 69, if the controller 18 detects that the representation 69 changes its direction of travel by some angle as it crosses the demarcation line 67 (by deriving a first direction of travel based on positions 70a and 70a', deriving a second direction of travel based on positions 70b and 70b', and by comparing the two directions of travel), then the controller 18 can adjust the remapping values accordingly for one or both of the images that are mapped to the zones 63D and 63R.

It may be that only the remapping values associated with pixels in the immediate vicinity of the representation 69 are adjusted. Thus, the vehicle 10 may drive along while the controller 18 scans for and detects target features 61 at different lateral positions on the road, so that different portions of the remapping table 32 are adjusted. As an alternative way, the vehicle 10 may drive along while the controller 18 scans for and detects multiple target features 61 at different lateral positions across each demarcation line 67. At a selected point in time (e.g., after having detected target features 61 over a selected amount of lateral positions along the demarcation line 67), the controller 18 may then determine a formula (or set of formulas) that could be used to remap the entire area along the demarcation line 67 as a whole, based on the changes in the positions of the representations 69. Then the controller 18 uses that formula (or set of formulas) to remap the entire area around the border. For greater certainty the formula or formulas may be linear or nonlinear.

After detecting a target feature 61 at a particular lateral position on the road, and adjusting a portion of the remapping table 32 through the techniques described above, the controller 18 may also scan for and detect a second target feature 61 at approximately the same lateral position on the road and apply these techniques again, in order to improve the accuracy of the adjustments to the remapping values.

In many situations (e.g. after a malfunctioning or damaged camera has been replaced in the vehicle or simply due to a shift in the position of a camera over time in the vehicle) it may be that a camera is no longer in the same position and orientation as it was before. As a result, during the calibration procedure some pixels will require a change in their remapping due to new changes that occur to representations 69 as they cross demarcation lines 67. If the changes to the remapping are only carried out in the immediate vicinity of the affected pixels then there will be a misalignment of those pixels with other pixels that are not changed. If the changes are made to all the pixels in an image 26 then this could cause a problem with the remapping of pixels at the other demarcation line 67 at the other end of the image 26. To address this issue, when a new remapping is carried out on a selected pixel, the remapping is carried out in progressively diminishing amounts on a range of adjacent pixels. For example, if during a calibration it is determined that a particular pixel should be shifted 5 pixels laterally, a selected first number of pixels longitudinally adjacent to that pixel will be shifted 5 pixels laterally, a selected second number of pixels longitudinally adjacent to the first number of pixels will be shifted 4 pixels laterally, a selected third number of pixels adjacent to the second number of pixels will be shifted 3 pixels laterally, and so on until there is no lateral shift to carry out. This effectively smoothes out the remapping of the pixels, as an example, in a car wherein the front camera is damaged in a traffic accident, and is replaced, a recalibration will be carried out, and the controller 18 may detect that the remapping that applied at the front left and right demarcation lines 67 does not work anymore. The controller 18 may determine a new remapping for these regions. However, the remapping that occurs at the rear left and right demarcation lines is still good, since the left, right and rear cameras have not been moved. To address this, the controller 18 may remap some selected number of pixels (e.g. 50 pixels), rearward of the newly remapped pixels along the front left and right demarcation lines 67 in groups by progressively smaller amounts eventually reducing the remapping to zero. No remapping of pixels takes place along the rear left and right demarcation lines 67.

After a selected period of time of driving, or after detecting enough target features at enough lateral positions to ensure that a sufficient amount of adjustment of the remapping table has been made, the controller 18 may end the calibration process.

The particular cameras 16 that are used in the camera system 14 may be any suitable cameras. One example of an acceptable camera is a ReversAid camera made by Magna Electronics, an operating unit of Magna International Inc. of Aurora, Ontario, Canada.

The camera or vision system includes a display screen that is in communication with a video line and that is operable to display images captured by the camera or camera module. The display screen may be disposed in an interior rearview mirror assembly of the vehicle, and may comprise a video mirror display screen, with video information displayed by the display screen being viewable through a transflective mirror reflector of the mirror reflective element of the interior rearview mirror assembly of the vehicle. For example, the camera or camera module may be disposed at a rearward portion of the vehicle and may have a rearward facing field of view. The display screen may be operable to display images captured by the rearward viewing camera during a reversing maneuver of the vehicle.

Surround view/panoramic vision/birds-eye vision multi-camera systems are known, such as described in U.S. Pat. Nos. 6,275,754; 6,285,393; 6,483,429; 6,498,620; 6,564,130; 6,621,421; 6,636,258; 6,819,231; 6,917,378; 6,970,184; 6,989,736; 7,012,549; 7,058,207; 7,071,964; 7,088,262; 7,145,519; 7,161,616; 7,230,640; 7,248,283; 7,280,124; 7,295,227; 7,295,229; 7,301,466; 7,317,813; 7,369,940; 7,463,281; 7,468,745; 7,519,459; 7,592,928; 7,680,570; 7,697,027; 7,697,029; 7,742,070; 7,768,545 and/or 7,782,374, and/or U.S. Publication Nos. 2003/0137586; 2005/0030379; 2005/0174429; 2005/0203704; 2007/0021881; 2007/0165909; 2008/0036857; 2008/0144924; 2009/0179773 and/or 2010/0013930, and/or International Publication Nos. WO2000/064175; WO2005/074287; WO2007/049266; WO2008/044589; WO2009/095901; WO2009/132617; and/or WO2011/014482, and/or European Pat. Publication Nos. EP1022903; EP1179958; EP1197937; EP1355285; EP1377062; EP1731366 and/or EP1953698, and/or MURPHY, TOM, "Looking Back to the Future—How hard can it be to eliminate a driver's blindspot?", Ward's AutoWorld, May 1, 1998, which are all hereby incorporated herein by reference in their entireties. Such systems benefit from the present invention.

The video display is operable to display a merged or composite image to provide a panoramic or surround view for viewing by the driver of the vehicle. The vision system may utilize aspects of the vision and display systems described in U.S. Pat. Nos. 5,550,677; 5,670,935; 6,498,620; 6,222,447 and/or 5,949,331, and/or PCT Application No. PCT/US2011/061124, filed Nov. 17, 2011, and/or PCT Application No. PCT/US2010/025545, filed Feb. 26, 2010 and published on Sep. 2, 2010 as International Publication No. WO 2010/099416, which are hereby incorporated herein by reference in their entireties.

Optionally, the video display may display other images, and may display a surround view or bird's-eye view or panoramic-view images or representations at the display screen, such as by utilizing aspects of the display systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. provisional applications, Ser. No. 61/540,256, filed Sep. 28, 2011; Ser. No. 61/466,138, filed Mar. 22, 2011; Ser. No. 61/452,816, filed Mar. 15, 2011; and Ser. No. 61/426,328, filed Dec. 22, 2010, which are all hereby incorporated herein by reference in their entireties. Examples of bird's eye view systems and associated techniques are described in U.S. Pat. Nos. 5,670,935; 6,636,258; 7,145,519; 7,161,616; 7,230,640; 7,248,283; 7,295,229; 7,301,466 and/or 7,592,928, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, which are hereby incorporated herein by reference in their entireties. Optionally, the camera and video display may operate to display other images, and may display a trailer angle or the like of a trailer behind the vehicle.

The vision display system may operate to display the rearward images at the video mirror display, and may do so responsive to the driver of the vehicle shifting the vehicle into a reverse gear (such as by utilizing aspects of the vision systems described in U.S. Pat. Nos. U.S. Pat. Nos. 5,550,677; 5,670,935; 6,498,620; 6,222,447 and/or 5,949,331, and/or PCT Application No. PCT/US2011/056295, filed Oct. 14, 2011, which are hereby incorporated herein by reference in their entireties).

Optionally, the system of the present invention may utilize aspects of the vision systems and lane departure systems and/or lane change aids and/or side object detection systems of the types described in U.S. Pat. Nos. 7,914,187; 7,720,580; 7,526,103; 7,038,577; 7,004,606; 6,946,978; 6,882,287 and/or 6,396,397, and/or PCT Application No. PCT/US2011/059089, filed Nov. 3, 2011, which are hereby incorporated herein by reference in their entireties.

The imaging sensor or camera that captures the image data for image processing may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The camera or imaging sensor and/or the logic and control circuit of the imaging sensor may function in any known manner, such as by utilizing aspects of the vision or imaging systems described in U.S. Pat. Nos. 6,806,452; 6,690,268; 7,005,974; 7,123,168; 7,004,606; 6,946,978; 7,038,577; 6,353,392; 6,320,176; 6,313,454; 6,824,281; 5,550,677; 5,877,897; 6,498,620; 5,670,935; 5,796,094 and/or 6,396,397, and/or PCT Application No. PCT/US2010/028621, filed Mar. 25, 2010, which are all hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 7,965,336; 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or PCT Application No. PCT/US2008/076022, filed Sep. 11, 2008 and published Mar. 19, 2009 as International Publication No. WO/2009/036176, and/or PCT Application No. PCT/

US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; 5,530,240; 6,329,925; 7,855,755; 7,626,749; 7,581,859; 7,446,650; 7,446,924; 7,370,983; 7,338,177; 7,274,501; 7,255,451; 7,195,381; 7,184,190; 5,668,663; 5,724,187; 7,338,177; 5,910,854; 6,420,036 and/or 6,642,851, and/or European patent application, published Oct. 11, 2000 under Publication No. EP 0 1043566, and/or PCT Application No. PCT/US2011/056295, filed Oct. 14, 2011, and/or U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, and/or U.S. provisional applications, Ser. No. 61/466,138, filed Mar. 22, 2011; Ser. No. 61/452,816, filed Mar. 15, 2011; and Ser. No. 61/426,328, filed Dec. 22, 2010, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A method for determining alignment of cameras at a vehicle relative to one another, said method comprising:
mounting a first camera at a vehicle so as to have a first field of view encompassing a road surface of a road along which the vehicle is traveling;
mounting a second camera at the vehicle so as to have a second field of view encompassing the road surface of the road along which the vehicle is traveling;
wherein the first and second fields of view of the first and second cameras overlap partially;
providing an image processor at the vehicle;
while the vehicle is moving along the road, capturing first image data via the first camera;
while the vehicle is moving along the road, capturing second image data via the second camera;
providing first image data captured by the first camera to the image processor;
providing second image data captured by the second camera to the image processor;
processing, via the image processor, first image data captured by the first camera;
processing, via the image processor, second image data captured by the second camera;
dewarping the first image data and the second image data;
while the vehicle is moving along the road, determining, via processing of first image data captured by the first camera, movement of a road feature present in first image data captured by the first camera;
while the vehicle is moving along the road, determining, via processing of second image data captured by the second camera, movement of the road feature when the road feature is present in second image data captured by the second camera;

comparing the determined movement of the road feature in first image data captured by the first camera to the determined movement of the road feature in second image data captured by the second camera while the vehicle is moving along the road;

determining, via comparing the determined movements of the road feature, a rotational and translational offset of the second camera at the vehicle relative to the first camera at the vehicle; and responsive to determination of the rotational and translational offset of the second camera at the vehicle relative to the first camera at the vehicle, remapping the first and second image data based at least in part on the determined rotational and translational offset to at least partially accommodate misalignment of the second camera relative to the first camera.

2. The method of claim 1, wherein the first camera is mounted at the vehicle so as to have a sideward field of view, and wherein the second camera is mounted at the vehicle so as to have a rearward field of view.

3. The method of claim 1, wherein the first camera is mounted at the vehicle so as to have a forward field of view, and wherein the second camera is mounted at the vehicle so as to have a sideward field of view.

4. The method of claim 3, comprising mounting a third camera at the vehicle so as to have a rearward field of view.

5. The method of claim 4, comprising, while the vehicle is moving along the road, (i) determining, via processing of captured image data, movement of the road feature when the road feature is present in third image data captured by the third camera, (ii) comparing the determined movement of the road feature in second image data captured by the second camera to the determined movement of the road feature in third image data captured by the third camera, and (iii) determining, via comparing the determined movements of the road feature, a rotational and translational offset of the third camera at the vehicle relative to the second camera at the vehicle.

6. The method of claim 1, wherein determining the rotational and translational offset of the second camera at the vehicle relative to the first camera at the vehicle comprises determining, via comparing the determined movements of the road feature, a horizontal shift of the road feature while the vehicle is moving along the road.

7. The method of claim 1, wherein determining the rotational and translational offset of the second camera at the vehicle relative to the first camera at the vehicle comprises determining, via comparing the determined movements of the road feature, a vertical shift of the road feature in the second image data captured by the second camera as compared to the first image data captured by the first camera while the vehicle is moving along the road.

8. The method of claim 1, wherein determining the rotational and translational offset of the second camera at the vehicle relative to the first camera at the vehicle comprises determining, via comparing the determined movements of the road feature, a rotation of the road feature in the second image data captured by the second camera as compared to the first image data captured by the first camera while the vehicle is moving along the road.

9. The method of claim 1, comprising displaying video images derived from image data captured by the first and second cameras.

10. A method for determining alignment of cameras at a vehicle relative to one another, said method comprising:

mounting a first camera at a vehicle so as to have a first field of view encompassing a road surface of a road along which the vehicle is traveling;

mounting a second camera at the vehicle so as to have a second field of view encompassing the road surface of the road along which the vehicle is traveling;

wherein the first camera is mounted at the vehicle so as to have a sideward field of view, and wherein the second camera is mounted at the vehicle so as to have a rearward field of view;

wherein the first and second fields of view of the first and second cameras overlap partially;

providing an image processor at the vehicle;

while the vehicle is moving along the road, capturing first image data via the first camera;

while the vehicle is moving along the road, capturing second image data via the second camera;

providing first image data captured by the first camera to the image processor;

providing second image data captured by the second camera to the image processor;

processing, via the image processor, first image data captured by the first camera;

processing, via the image processor, second image data captured by the second camera;

dewarping the first image data and the second image data;

while the vehicle is moving along the road, determining, via processing of first image data captured by the first camera, movement of a road feature present in first image data captured by the first camera;

while the vehicle is moving along the road, determining, via processing of second image data captured by the second camera, movement of the road feature when the road feature is present in second image data captured by the second camera;

comparing the determined movement of the road feature in first image data captured by the first camera to the determined movement of the road feature in second image data captured by the second camera while the vehicle is moving along the road;

determining, via comparing the determined movements of the road feature, a rotational and translational offset of the second camera at the vehicle relative to the first camera at the vehicle;

responsive to determination of the rotational and translational offset of the second camera at the vehicle relative to the first camera at the vehicle, remapping the first and second image data based at least in part on the determined rotational and translational offset to at least partially accommodate misalignment of the second camera relative to the first camera; and displaying video images derived from image data captured by the first and second cameras.

11. The method of claim 10, wherein determining the rotational and translational offset of the second camera at the vehicle relative to the first camera at the vehicle comprises determining, via comparing the determined movements of the road feature, a horizontal shift of the road feature while the vehicle is moving along the road.

12. The method of claim 10, wherein determining the rotational and translational offset of the second camera at the vehicle relative to the first camera at the vehicle comprises determining, via comparing the determined movements of the road feature, a vertical shift of the road feature while the vehicle is moving along the road.

13. The method of claim 10, wherein determining the rotational and translational offset of the second camera at the vehicle relative to the first camera at the vehicle comprises determining, via comparing the determined movements of the road feature, a rotation of the road feature while the vehicle is moving along the road.

14. A method for determining alignment of cameras at a vehicle relative to one another, said method comprising:

mounting a first camera at a vehicle so as to have a first field of view encompassing a road surface of a road along which the vehicle is traveling;

mounting a second camera at the vehicle so as to have a second field of view encompassing the road surface of the road along which the vehicle is traveling;

wherein the first camera is mounted at the vehicle so as to have a forward field of view, and wherein the second camera is mounted at the vehicle so as to have a sideward field of view;

wherein the first and second fields of view of the first and second cameras overlap partially;

providing an image processor at the vehicle;

while the vehicle is moving along the road, capturing first image data via the first camera;

while the vehicle is moving along the road, capturing second image data via the second camera;

providing first image data captured by the first camera to the image processor;

providing second image data captured by the second camera to the image processor;

processing, via the image processor, first image data captured by the first camera;

processing, via the image processor, second image data captured by the second camera;

dewarping the first image data and the second image data;

while the vehicle is moving along the road, determining, via processing of first image data captured by the first camera, movement of a road feature present in first image data captured by the first camera;

while the vehicle is moving along the road, determining, via processing of second image data captured by the second camera, movement of the road feature when the road feature is present in second image data captured by the second camera;

comparing the determined movement of the road feature in first image data captured by the first camera to the determined movement of the road feature in second image data captured by the second camera while the vehicle is moving along the road;

determining, via comparing the determined movements of the road feature, a rotational and translational offset of the second camera at the vehicle relative to the first camera at the vehicle;

wherein determining the rotational and translational offset of the second camera at the vehicle relative to the first camera at the vehicle comprises determining, via comparing the determined movements of the road feature, a rotation of the road feature while the vehicle is moving along the road;

responsive to determination of the rotational and translational offset of the second camera at the vehicle relative to the first camera at the vehicle, remapping the first and second image data based at least in part on the determined rotational and translational offset to at least partially accommodate misalignment of the second camera relative to the first camera; and displaying video images derived from image data captured by the first and second cameras.

15. The method of claim 14, comprising mounting a third camera at the vehicle so as to have a rearward field of view.

16. The method of claim 15, comprising, while the vehicle is moving along the road, (i) determining, via processing of captured image data, movement of the road feature when the road feature is present in third image data captured by the third camera, (ii) comparing the determined movement of the road feature in second image data captured by the second camera to the determined movement of the road feature in third image data captured by the third camera, and (iii) determining, via comparing the determined movements of the road feature, a rotational and translational offset of the third camera at the vehicle relative to the second camera at the vehicle.

17. The method of claim 14, wherein determining the rotational and translational offset of the second camera at the vehicle relative to the first camera at the vehicle comprises determining, via comparing the determined movements of the road feature, a horizontal shift of the road feature while the vehicle is moving along the road.

18. The method of claim 14, wherein determining the rotational and translational offset of the second camera at the vehicle relative to the first camera at the vehicle comprises determining, via comparing the determined movements of the road feature, a vertical shift of the road feature while the vehicle is moving along the road.

* * * * *